United States Patent
Chang et al.

(10) Patent No.: US 12,026,454 B2
(45) Date of Patent: Jul. 2, 2024

(54) STORAGE OF CONTENT ASSOCIATED WITH A RESOURCE LOCATOR

(71) Applicant: GOOGLE LLC, Mountain View, CA (US)

(72) Inventors: Mark Chang, Seattle, WA (US); Sébastien Séguin-Gagnon, Montréal (CA); David Bokan, Toronto (CA); Grant Wang, Mountain View, CA (US); Nasim Sedaghat, Montreal (CA); Jason Edward Dishlip, Seattle, WA (US); Joel Roger Beukelman, Franklin, TN (US); Evelyn Tio, San Francisco, CA (US); Arielle Baio, Santa Clara, CA (US); Shuangshuang Li, Los Angeles, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/148,789

(22) Filed: Dec. 30, 2022

(65) Prior Publication Data
US 2023/0214584 A1    Jul. 6, 2023

Related U.S. Application Data

(60) Provisional application No. 63/266,291, filed on Dec. 31, 2021.

(51) Int. Cl.
*G06F 40/169* (2020.01)
*G06F 3/0483* (2013.01)
(Continued)

(52) U.S. Cl.
CPC .......... *G06F 40/169* (2020.01); *G06F 3/0483* (2013.01); *G06F 3/0485* (2013.01);
(Continued)

(58) Field of Classification Search
CPC ..................................................... G06F 40/169
See application file for complete search history.

(56) References Cited

U.S. PATENT DOCUMENTS

| 8,533,586 | B1 * | 9/2013 | Meyer | G06F 40/169 |
|---|---|---|---|---|
| | | | | 715/230 |
| 8,640,023 | B1 * | 1/2014 | Murray | G06F 16/954 |
| | | | | 715/256 |

(Continued)

FOREIGN PATENT DOCUMENTS

| AU | 2007325055 A1 * | 6/2009 | ............ G06F 17/211 |

OTHER PUBLICATIONS

International Search Report and Written Opinion for PCT Application No. PCT/US2022/082643, dated Apr. 13, 2023, 13 pages.
(Continued)

*Primary Examiner* — Asher D Kells
(74) *Attorney, Agent, or Firm* — Brake Hughes Bellermann LLP

(57) ABSTRACT

A method can be performed by a browser. The method can include presenting at least a portion of a resource address; presenting a rendered webpage in a browser content window, the rendered webpage being associated with the resource address; presenting an annotation area, the annotation area being outside the browser content window; receiving, in association with a user account, an annotation in the annotation area; and storing the annotation in association with the user account and the resource address.

20 Claims, 22 Drawing Sheets

(51) Int. Cl.
  *G06F 3/04842* (2022.01)
  *G06F 3/0485* (2022.01)
  *G06F 16/954* (2019.01)
  *G06F 16/958* (2019.01)
(52) U.S. Cl.
  CPC .......... *G06F 16/954* (2019.01); *G06F 16/958* (2019.01); *G06F 3/04842* (2013.01)

(56) References Cited

U.S. PATENT DOCUMENTS

| | | | |
|---|---|---|---|
| 10,402,883 B2* | 9/2019 | Nguyen | G06Q 30/0603 |
| 2004/0205514 A1* | 10/2004 | Sommerer | G06F 40/106 |
| | | | 715/205 |
| 2004/0205542 A1* | 10/2004 | Bargeron | G06F 40/169 |
| | | | 715/201 |
| 2006/0075205 A1* | 4/2006 | Martin | G06F 16/9566 |
| | | | 707/E17.115 |
| 2007/0022098 A1* | 1/2007 | Malik | G06F 16/9535 |
| 2007/0022135 A1* | 1/2007 | Malik | G06F 16/955 |
| | | | 707/999.102 |
| 2007/0174762 A1* | 7/2007 | Plant | G06F 40/169 |
| | | | 715/205 |
| 2009/0006556 A1* | 1/2009 | Agarwal | G06F 16/955 |
| | | | 709/206 |
| 2009/0171898 A1* | 7/2009 | Prager | G06F 16/951 |
| 2010/0011282 A1* | 1/2010 | Dollard | G06F 40/169 |
| | | | 715/810 |
| 2010/0070851 A1* | 3/2010 | Chen | G06F 16/986 |
| | | | 715/236 |
| 2012/0131441 A1* | 5/2012 | Jitkoff | G06Q 30/0641 |
| | | | 715/234 |
| 2013/0080872 A1* | 3/2013 | Manber | G06F 3/0482 |
| | | | 715/230 |
| 2013/0132815 A1* | 5/2013 | Manber | G06F 3/0482 |
| | | | 715/230 |
| 2015/0278182 A1 | 10/2015 | Nicholas et al. | |
| 2016/0203114 A1* | 7/2016 | Karalis | G06F 16/986 |
| | | | 715/230 |
| 2018/0373688 A1* | 12/2018 | Mukherjee | G06F 16/957 |
| 2020/0278788 A1* | 9/2020 | Suman | G06F 3/04855 |
| 2021/0141991 A1 | 5/2021 | Pinnamaneni | |
| 2021/0141997 A1* | 5/2021 | Pinnamaneni | G06F 3/04847 |

OTHER PUBLICATIONS

Abhay, "Microsoft announces improvements coming to Collections in Edge", Neowin (https://www.neowin.net/news/microsoft-announces-improvements-coming-to-collections-in-edge/), Feb. 2, 2021, 2 pages.

* cited by examiner

STORAGE OF CONTENT ASSOCIATED WITH A RESOURCE LOCATOR

CROSS-REFERENCE TO RELATED APPLICATION

This application is a non-provisional of, and claims the benefit of priority to, U.S. Provisional Application No. 63/266,291, filed on Dec. 31, 2021, entitled, "BROWSER-BASED ANNOTATION INTERFACE FOR INTERNET DOCUMENTS," the disclosure of which is hereby incorporated by reference.

BACKGROUND

Websites provide information or functionality helpful to users, and many users use the Internet to research products, places, companies, services, etc. Webpages that are associated with websites are typically stored on remote servers.

SUMMARY

Research across different sites and different webpages within those sites can be complex and often involves synthesis, comparison, and decision making. Users can view the webpages within a browser that is executing on a local computing device. Implementations provide a tool integrated into the browser that assists in these and other tasks. The tool includes a novel user interface and new browser functionalities, such as storing information associated with webpages and/or websites. The stored information that is associated with the webpages and/or websites is also associated with a user account. The stored information associated with the webpages and/or websites is generated by a user who owns and/or controls the user account. The stored information is inaccessible to the server that maintains the website with which user-generated information is associated. The novel user interface, referred to as an annotation user interface, helps users organize, understand, and take action on Internet-based documents without coordination and/or communication with the server and/or entity that maintains the website. The annotation user interface provides a highly integrated information-generating (e.g., notetaking) experience that solves decision funnel problems. In particular, the annotation user interface can include intelligence that enables users to pull out the most important details from a website or a collection of websites, to compare information across websites, and return to the original content (webpages) without having to bookmark the content and without providing the information to the servers and/or entities that maintain the websites. The annotation user interface can lift rich content, provide suggestions for notes and/or images, and/or organize annotations around an annotation target. Annotation targets can represent a webpage (source document), a topic, a tab group, etc. The annotation user interface enables users to integrate user-originated annotations with suggested content, track annotations across websites, e.g., by associating annotations with a topic or tab group, and to compare notes across sites, and webpages. The user interface can be surfaced in multiple ways in association with the user account and can be presented with varying levels of detail (e.g., inside a side panel, across multiple tables, or as a standalone document). Integrating the annotation interface with a browser enables a browser to separate the annotation data from a rendering process. Such separation can make the interface appear integrated but prevents annotations themselves from being exposed to the rendering process, preventing the servers and/or administrators that maintain the websites from obtaining knowledge of the annotations.

A method can be performed by a browser. The method can include presenting at least a portion of a resource address; presenting a rendered webpage in a browser content window, the rendered webpage being associated with the resource address; presenting an annotation area, the annotation area being outside the browser content window; receiving, in association with a user account, an annotation in the annotation area; and storing the annotation in association with the user account and the resource address.

A non-transitory computer-readable storage medium comprising instructions stored thereon that, when executed by at least one processor, are configured to cause a computing system to present at least a portion of a resource address; present a rendered webpage in a browser content window, the rendered webpage being associated with the resource address; present an annotation area, the annotation area being outside the browser content window; receive, in association with a user account, an annotation in the annotation area; and store the annotation in association with the user account and the resource address.

A computing system can include at least one processor and a non-transitory computer-readable storage medium. The non-transitory computer-readable storage medium can comprise instructions stored thereon that, when executed by the at least one processor, are configured to cause the computing system to present at least a portion of a resource address; present a rendered webpage in a browser content window, the rendered webpage being associated with the resource address; present an annotation area, the annotation area being outside the browser content window; receive, in association with a user account, an annotation in the annotation area; and store the annotation in association with the user account and the resource address.

The details of one or more implementations are set forth in the accompanying drawings and the description below. Other features will be apparent from the description and drawings.

BRIEF DESCRIPTION OF THE DRAWINGS

FIGS. 2A and 2B illustrate another example technique for surfacing a browser annotation interface, according to an aspect.

FIGS. 3A and 3B illustrate an example browser annotation interface for a computing device with limited display area, according to an aspect.

FIGS. 5A-5D illustrate example browser annotation interfaces with grouped annotation content, according to some aspects.

Like reference numbers refer to like elements.

DETAILED DESCRIPTION

Implementations relate to providing a browser-integrated annotation system for annotating Internet-based documents, such as websites, webpages, and the like, and storing the annotations. Integrating the annotation system into the browser promotes useability and facilitates synthesis across webpages, tabs, and search sessions, and allows the annotations to be stored in association with a user account. The browser-based annotation system also facilitates organization and navigation and can provide automated assistance, such as auto-generated annotation suggestions. In some implementations, such suggestions may be based on machine-learned models, document structure, and/or historical information (e.g., analysis of anonymized search records). Because the annotation interface is integrated into the browser, implementations can provide several different techniques for surfacing the annotation interface and can serve as a navigational aid.

Figure 1A:
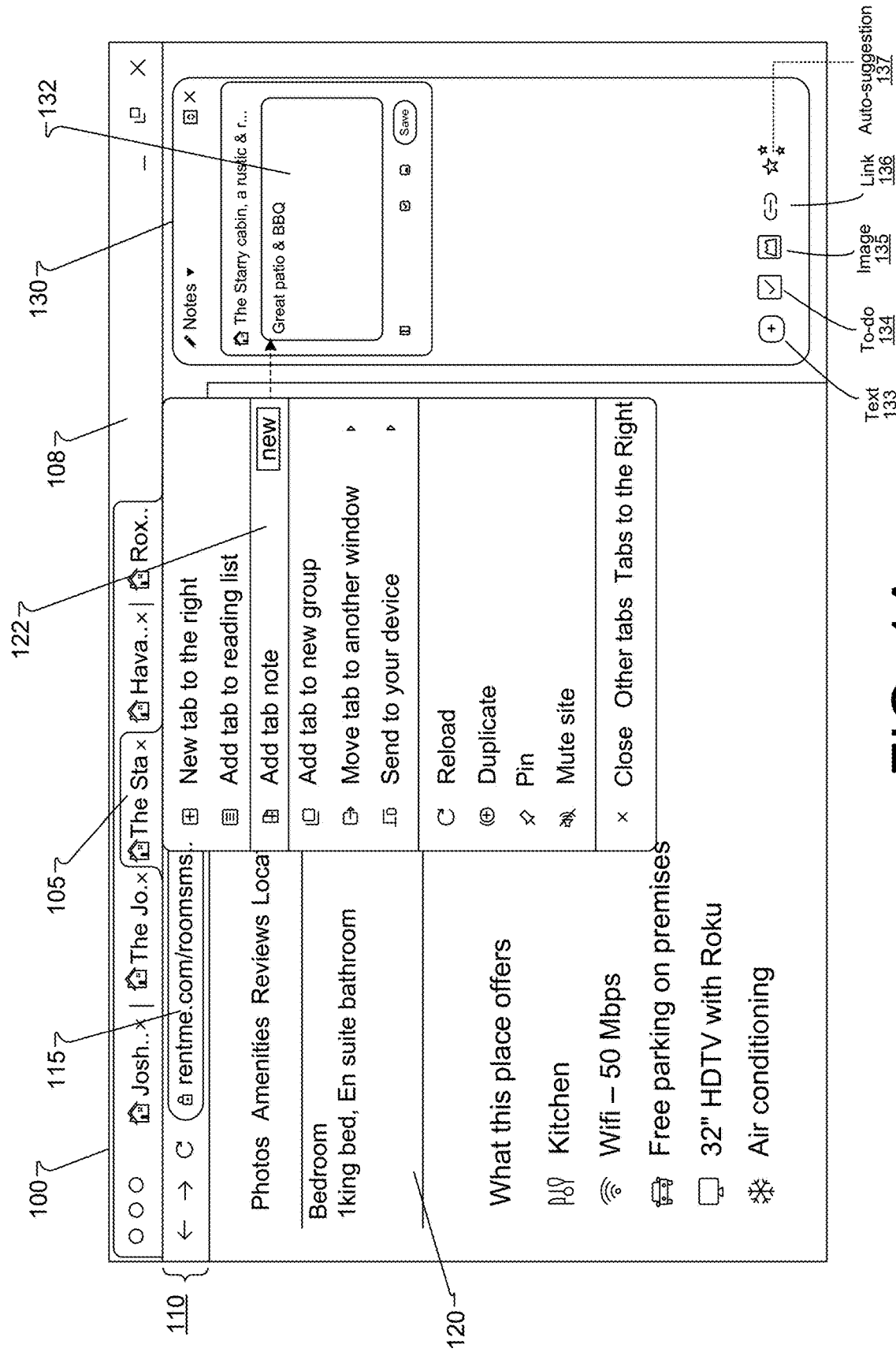
FIGS. 1A-1D illustrate example techniques for surfacing a browser annotation interface, according to some aspects.

FIG. 1A illustrates an example browser user interface (UI) 100, in accordance with implementations described herein. In general, the UI 100 is generated and rendered by a browser application (e.g., browser application 718 of FIG. 7) executing in an operating system (e.g., operating system 710) of a computing device. The UI 100 includes a tab strip 108 associated with the browser application. In this example, the UI 100 includes five browser tabs 105, although any number of browser tabs or tab groups can be opened by the browser application. Each browser tab, e.g., browser tab 105, may be associated with web content (a webpage) presented in a corresponding browser content window 120 of the browser application. As used herein, a webpage refers to any content generated/served at least partially by/from a remote server hosting a website. The webpage can be associated with a resource address, such as a Uniform Resource Locator (URL) or a Uniform Resource Indicator (URI). The webpage can include HyperText Markup Language (HTML) content. The browser application can request the webpage from the remote server hosting the website based on the resource address (e.g., the URL). The browser application can request the webpage by, for example, sending a HyperText Transfer Protocol (HTTP) GET request to the remote server hosting the website. The webpage can refer to a progressive web application in addition to conventional webpages. In addition, as used herein, a source document refers to the webpage currently rendered in the browser content window 120 as well as any other data (metadata) that are used to render the document (e.g., markup and scripts that are not actually displayed).

The UI 100 also includes an address bar area 110. An address of the webpage displayed in the browser content window 120 can be illustrated in the address bar area 110 (e.g., in address input area 115). The address of the webpage can be represented as a resource address. The resource address included in the address bar area 110 can be associated with the webpage presented in the browser content window 120. In some examples, the address bar area 110 can present at least a portion of the resource address. Other controls, icons, and/or so forth can be included in the address bar area 110. For example, the address bar area 110 can include a user icon 125 (illustrated in FIG. 1B). The user icon 125 may provide an indication of a user account associated with the browser session. This user icon 125 can be an image, text, or some other representation of the user account. In some examples, the user account can be associated with a user, and a user may be required to input a unique username, as well as a passcode associated with the username, to engage in a browser session associated with the user account. In some examples, no login may be required to engage in the browser session, and the user account can be considered to be associated with the local computing device on which the browser application is executing. Other controls/icons included in the address bar area 110 can include a forward control, a back control, a refresh control, a home control, an extensions control, and/or a bookmark control. The address bar area 110 can be controlled by and/or associated with the browser (e.g., the browser application 718). The content of the address bar area 110 can be controlled by the browser application, whereas the content of the browser content window 120 is controlled by the webpage being displayed and/or a provider of the webpage. Thus, the appearance and user interface elements displayed in the address bar area 110 are controlled by the browser application.

The UI 100 includes an annotation user interface, illustrated as annotation area 130. In the example of FIG. 1A the annotation (or notes) area 130 is located in, or implemented as, a sidebar of the browser. The sidebar of the browser may be a continuous area, e.g., a combined area representing the address bar area 110 and the annotation area 130. Thus, content displayed (rendered) in the sidebar is controlled (determined) locally by the browser and not by the server hosting the website that is displayed (rendered) in the browser content window 120. While illustrated as a continuous area with the address bar area 110, the sidebar can be a split window, a pop-up window or some other portion of the browser UI 100. Annotations inputted into the annotation area 130 can be stored locally on the computing device on which the browser is executing, or remotely in association with the user account. The annotations inputted into the annotation area 130 can be inaccessible to the server hosting the website. No notification of annotations will be sent to the server hosting the website. In other words, annotations are associated with the website locally, without notifying or interacting with the server associated with the website. The storage of the annotations locally on the computing device and/or remotely in association with the user account allows the user to securely generate and store annotations without knowledge of the server hosting the website and/or any administrator of the website.

Annotations and/or notes can include content entered by a user into the annotation area 130. In some examples, annotations can include text inputted into the annotation area 130 by the user. In some examples, annotations can include modifications to the appearance and/or formatting settings of a portion of text included in the rendered webpage. The modifications to the appearance and/or formatting settings of a portion of text can include highlighting or changing a typeface. In some examples, annotations can include resource addresses (such as URLs) of other webpages. In some examples, annotations can include files uploaded by the user.

The annotation area 130 can be integrated as part of the browser user interface 100 (e.g., address bar area 110) so that the annotation area 130 may not be spoofed (e.g., imitated) by, for example, a third party or the owner of the content displayed in the browser content window 120. Because the annotation area 130 is part of the application of the browser application, the integration of the annotation area 130 would be difficult to imitate. In some implementations, the annotation area 130 may be surfaced (invoked, rendered) in response to a menu option, e.g., menu option 122. Menu option 122 may be an option provided in a menu that is displayed in response to a command to surface a tab menu, e.g., a right-click on tab 105.

In the example of FIG. 1A, there are currently no notes for the tab 105. Thus, the annotation area 130 includes a new note UI element 132. The new note UI element 132 can be any UI element that allows a user to enter text (e.g., via keyboard, speech-to-text, stylus, etc.). The annotation area 130 may include an indication of the tab/website with which the note is associated. The annotation area 130 may include controls for adding annotations (notes), which will be associated with the webpage currently displayed in the browser content window 120. The controls are configured to perform a predetermined task/operation when actuated by a user. The controls may include a text control 133 for adding a text-based note. The text control 133 may open a new note UI element, such as UI element 132. The controls may include a to-do control 134. The controls may include an image control 135. The image control 135 may enable a user to upload, take, and/or find an image to add as a note. The controls may include a link control 136. The link control 136 may enable a user to add a link to (address such as a URL of) another Internet-based document. The controls may include an auto-suggestion control 137. The auto-suggestion control 137 may cause the browser application to analyze the annotation target (e.g., content of the browser content window 120, both displayed and not displayed) and provide one or more suggestions of information items for inclusion in the notes for the annotation target. Examples of auto-suggestions are illustrated in FIGS. 4A-4F.

Figure 1B:
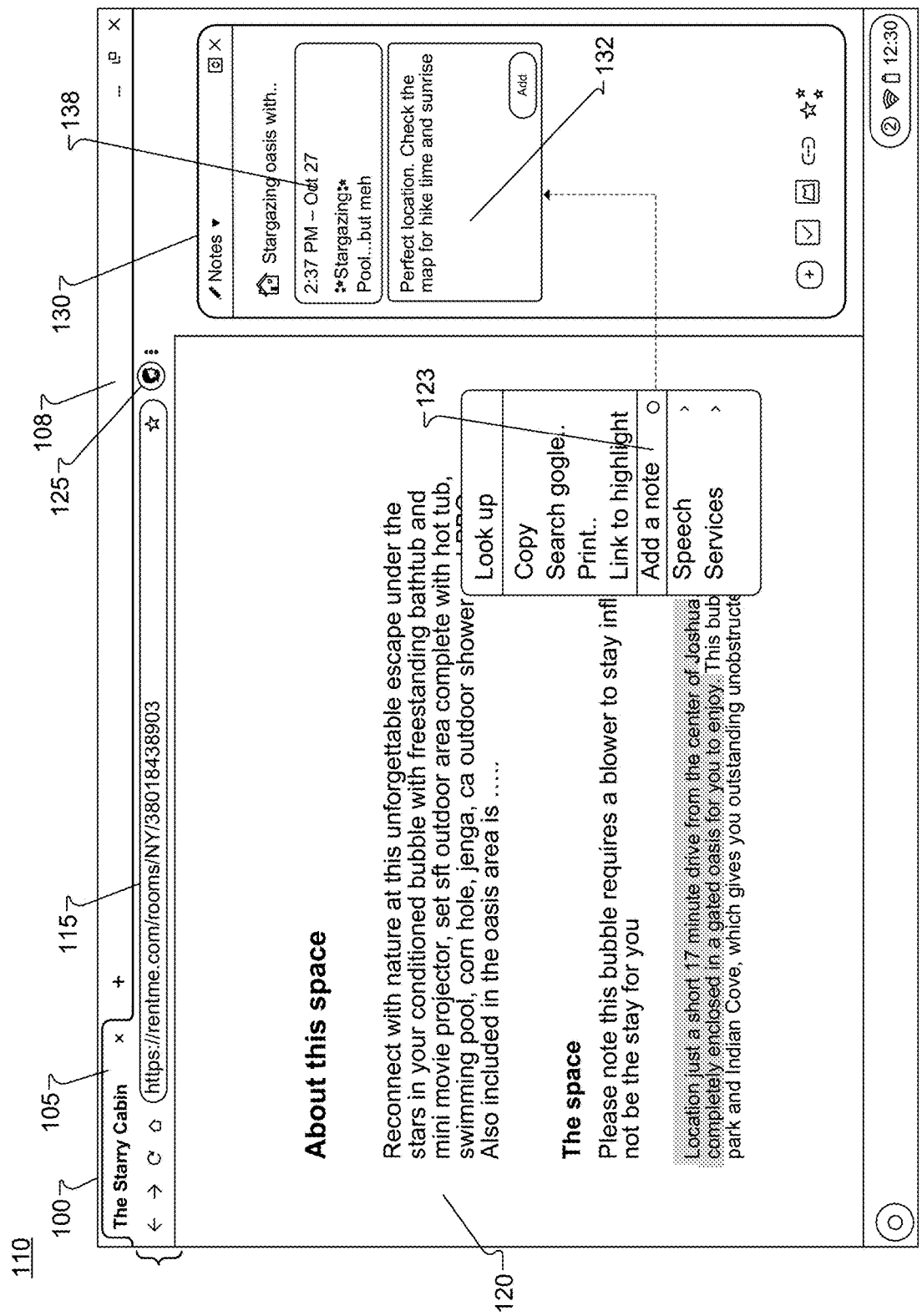

In some implementations, the annotation area 130 may be surfaced as illustrated in FIG. 1B. In FIG. 1B the annotation area 130 is surfaced in response to menu option 123. The menu option 123 may be provided in a menu that is displayed in response to a command to surface a selected text menu. Thus, for example, the user may select content displayed in the browser content window 120 and may right-click within the selection to bring up the menu with the menu option 123. In FIGS. 1B, 2A, 2B, 3A, and 3B, text with a shaded background is considered to be highlighted, which is an example of a modification to text. The highlighted text can be considered the content selected by the user, in which the user right-clicked on a mouse or otherwise provided input to a human-interface device (HID) to bring up the menu with the menu option 123. Selection of the menu option 123 may cause the annotation area 130 of FIG. 1B to be rendered by the browser application, e.g., by a rendering process of the browser application. In the example of FIG. 1B, the annotation target already has one existing note (which can be considered a first annotation associated with the webpage), so the annotation area 130 includes note 138 (which can be considered a second annotation associated with the webpage). In addition, an additional new note UI element 132 is included in the annotation area 130 in response to selection of the menu option 123. The technique for surfacing annotation area 130 illustrated in FIG. 1B can be combined with the technique for surfacing annotation area 130 illustrated in FIG. 1A. In other words, a browser may be configured to use either or both techniques.

Figure 1C:
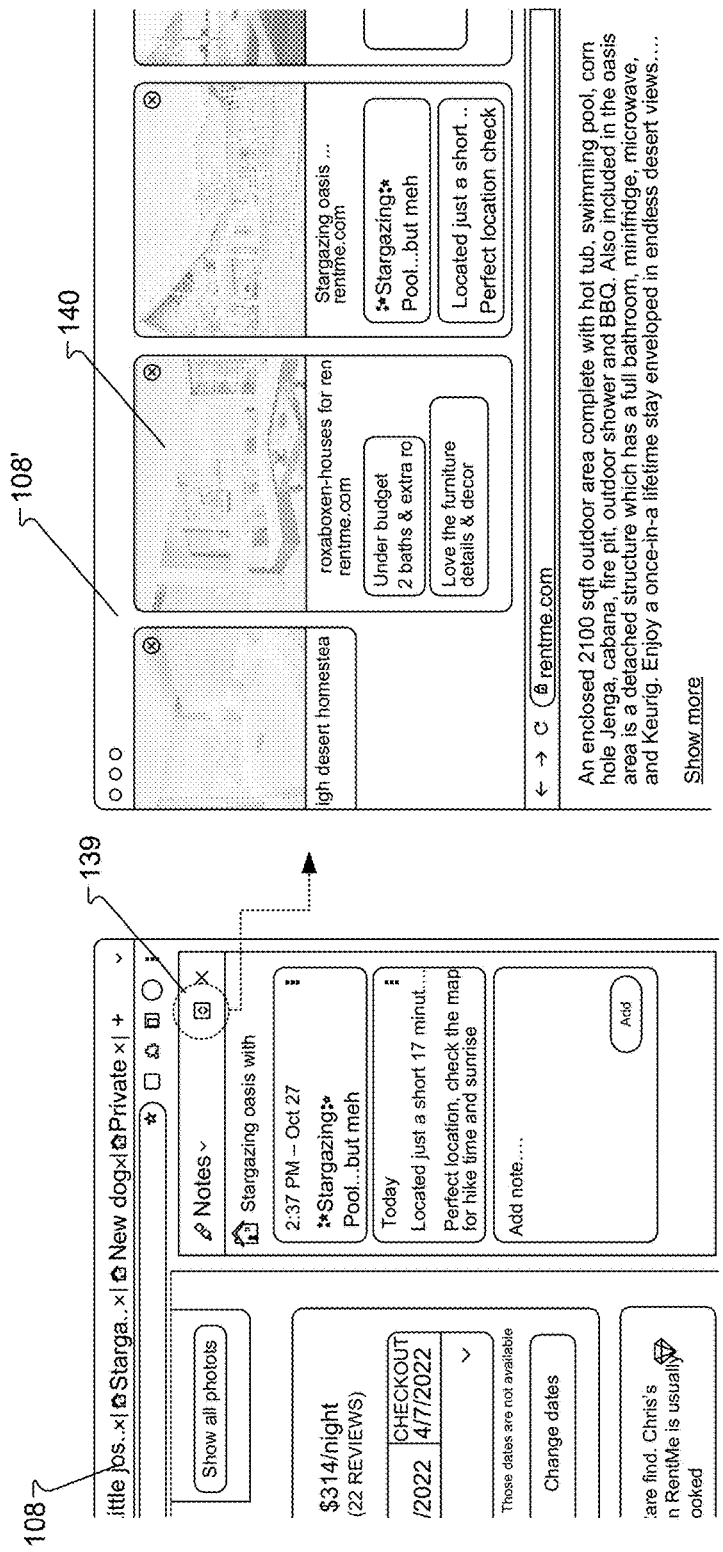

In some implementations, such as the example illustrated in FIG. 1C, the annotation area 130 may include a control 139 configured to expand the tab strip 108. The expanded tab strip 108' may display a preview area 140 for each tab. Each tab can be associated with a different annotation target, i.e., a resource such as a webpage, and/or website (such as a first resource, a second resource, and a third resource). The preview area 140 may include any existing notes for the annotation target associated with the tab, but may lack the controls (e.g., controls 133-137). Thus, the preview area 140 is a condensed version of the annotation area 130 for a tab. The preview area 140 can display portions of multiple rendered webpages and associated annotations, such as a portion of a first rendered webpage and a first annotation associated with the first rendered webpage, a portion of a second rendered webpage and a second annotation associated with the second rendered webpage, and a portion of a third rendered webpage and a third annotation associated with the third rendered webpage. The expanded tab strip 108' thus provides a novel way to quickly and conveniently compare notes associated with different annotation targets, e.g., across URLs, webpages and/or websites, tabs, tab groups, etc. The expanded tab strip 108' may cause the area of the browser content window 120 to shrink, so that some content previously viewable is now offscreen and/or not visible or displayed by the browser. The technique for surfacing preview area 140 illustrated in FIG. 1C can be combined with the technique for surfacing annotation area 130 illustrated in FIGS. 1A and 1B. In other words, a browser may be configured to use one, two, or all three techniques.

In some examples (not shown), the browser can present the preview area 140 for a tab in response to the user performing a pre-selection action for a tab, such as hovering a cursor over the tab or sliding a finger over the tab. The browser can present the webpage associated with the tab in response to the user making a second type of selection of the tab, such as clicking or tapping on the tab. In some implementations, the preview area 140 may include a selectable control configured to, when selected, cause the browser to concurrently present the webpage associated with the resource address (e.g., URL) and present the annotation area 130.

Figure 1D:
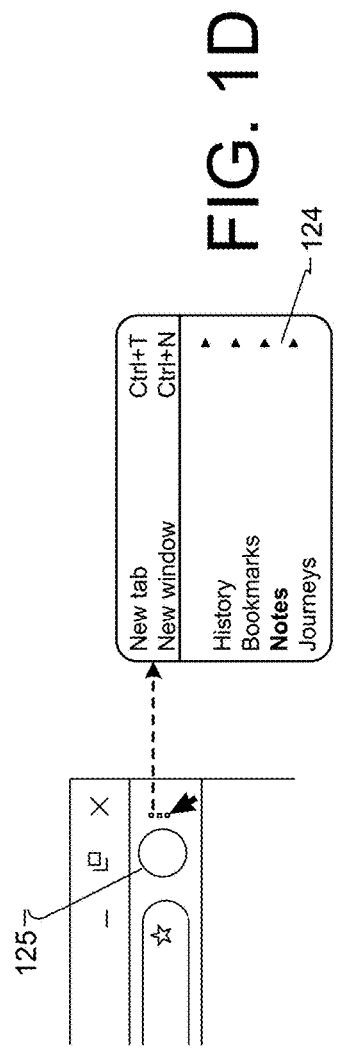

In some implementations, such as the example illustrated in FIG. 1D, the annotation area (e.g., annotation area 130) may be surfaced in response to a menu option 124. The menu option 124 may be provided in a menu that is displayed in response to selection of a control showing a browser menu, e.g., as illustrated in FIG. 1D. Although not illustrated in FIG. 1D, selection of the menu option 124 may cause the annotation area 130 of FIG. 1A or 1B to be rendered (depending on whether the source document of the annotation target (e.g., the current tab) has existing notes (e.g., 1B) or not (e.g., 1A)). The technique for surfacing annotation area 130 illustrated in FIG. 1D can be combined with the techniques described in FIGS. 1A-1C. In other words, a browser may be configured to use one, two, three, or all four techniques.

Figure 2A:
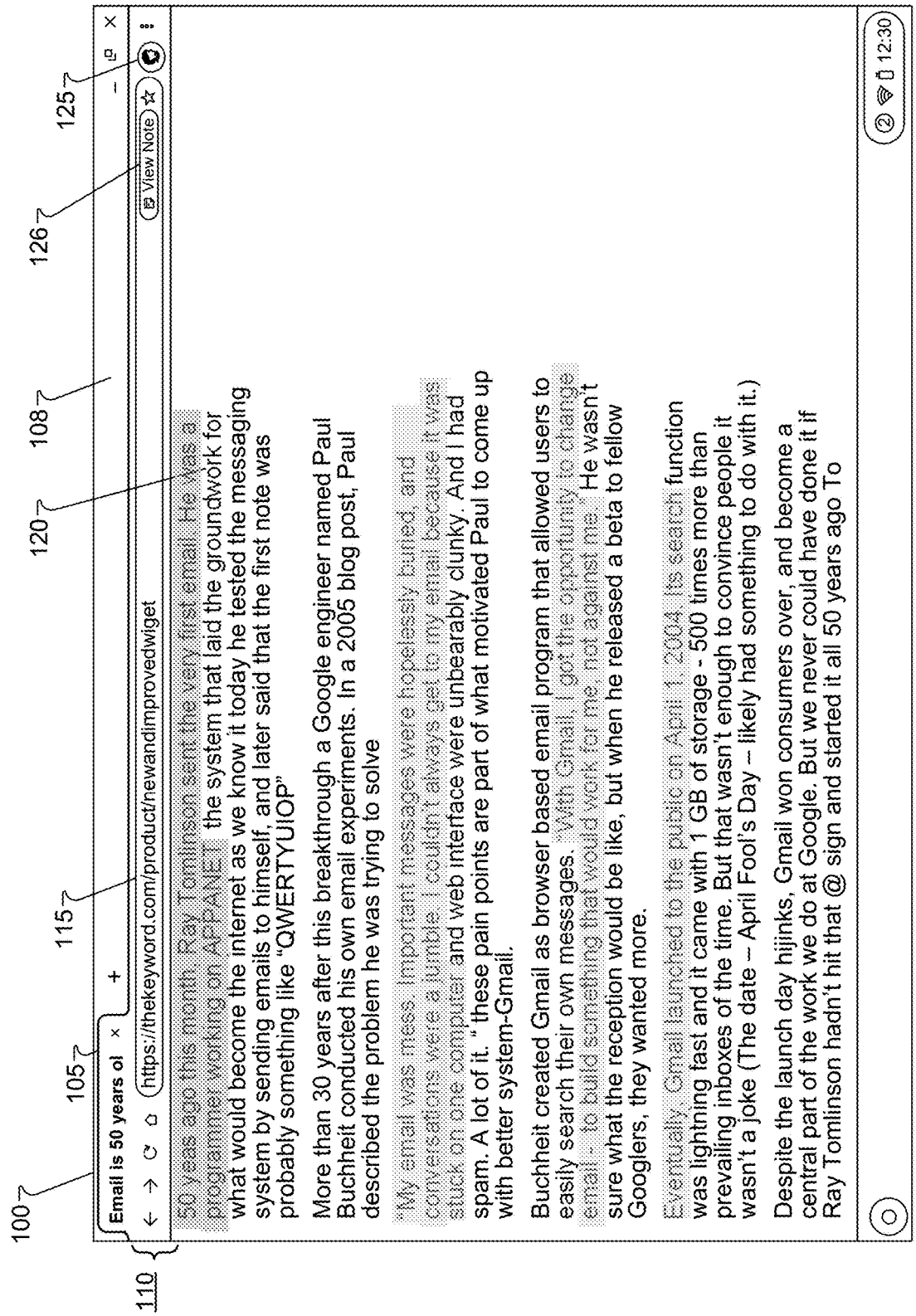

In some implementations, the annotation area 130 may be surfaced as illustrated in FIG. 2A. In the example of FIG. 2A, a control 126 is provided by the browser application. In some implementations, the control 126 may be provided in the address bar area 110. In some implementations (not shown), the control 126 may be positioned ahead of the address input area 115. In some implementations, the control 126 may be positioned in the address input area 115. In some implementations (not shown), the control 126 may be positioned after the address input area 115. The control 126 may be provided when the annotation target (e.g., the document currently displayed in browser content window 120) has associated notes (e.g., annotations). In some implementations, the control 126 may be provided regardless of whether the annotation target has associated notes and/or annotations. In some implementations, the appearance of the control 126 may change depending on whether or not the annotation target has associated notes and/or annotations. For example, the text of, color of, shading of, or icon included in the control 126 may differ depending on whether or not the annotation target has an associated note and/or annotation. In some implementations, the text may indicate the number (quantity) of existing notes and/or annotations for the annotation target. In the example shown in FIG. 2A, shaded background represents highlighting of text for portions of text that are associated with notes and/or annotations for the annotation target.

Figure 2B:
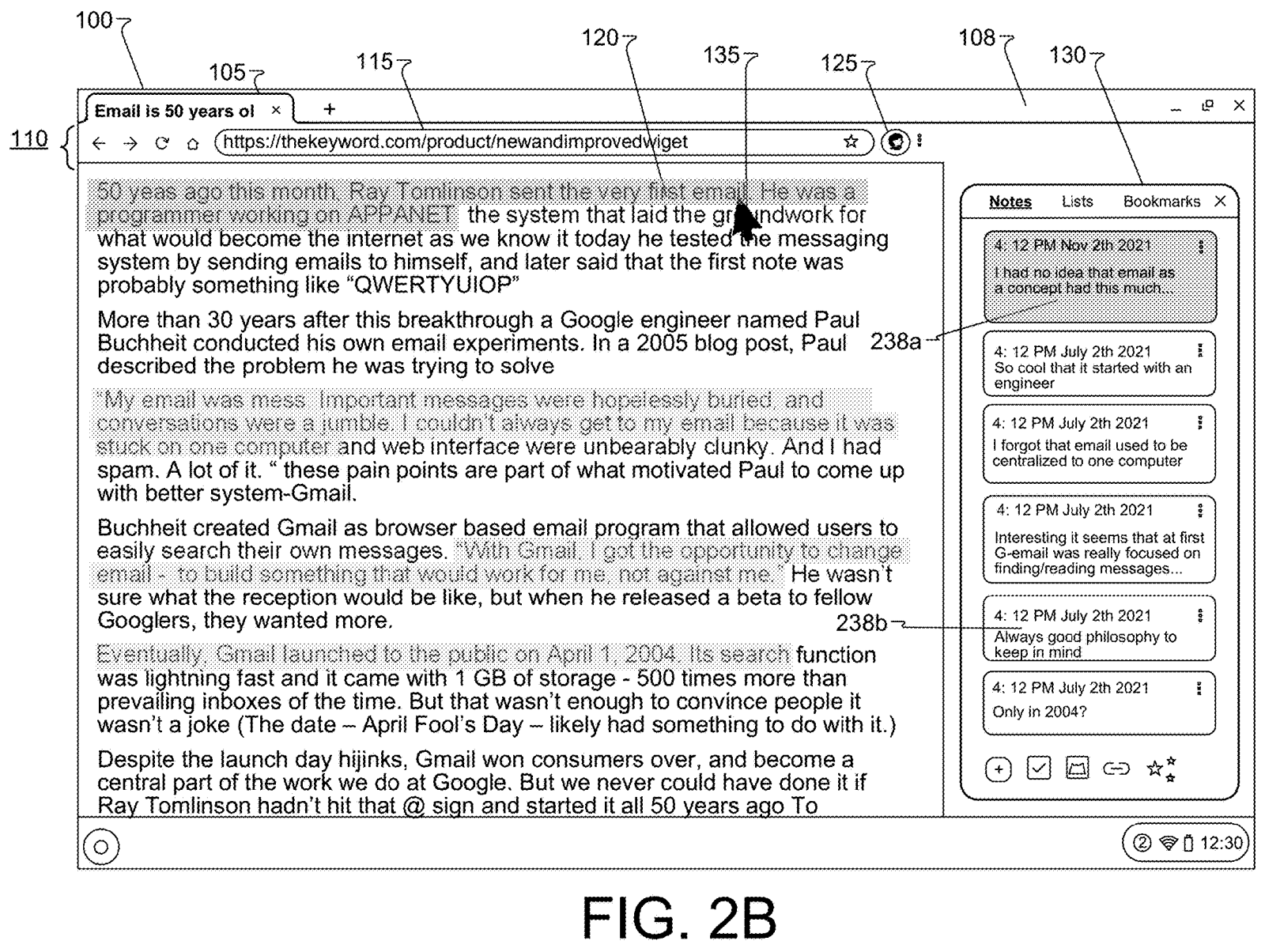

If a user actuates (selects) the control 126, such as by tapping and/or clicking on the control 126, the browser may render the annotation area 130 with notes for the annotation target, as illustrated in FIG. 2B. The existing notes and/or annotations (e.g., 238a, 238b, etc.) may be actionable and configured to navigate within the source document associated with the annotation target. For example, if the user actuates (selects, clicks on) existing note 238b and/or annotation, the browser may scroll the source document to the location associated with the existing note 238b and/or annotation. The interface of FIG. 2B also illustrates that content of a note and/or annotation may have a full highlight and/or partial highlight. For example, the content that corresponds to selected note 238a and/or annotation is illustrated with full highlight (shown by a darker shaded background) while text associated with other notes and/or annotations is illustrated with partial highlight (shown by a lighter shaded background in FIG. 2B). In some implementations, a selected note, such as note 238a in FIG. 2B, may also be highlighted (e.g., as shown by shading in FIG. 2B). If the user selects note 238b, the browser may cause the content associated with note 238b to appear with full highlight (which would be represented by a darker shaded background) and change the content associated with note 238a (if still displayed in the browser content window 120) to a partial highlight.

Figures 3A, 3B:
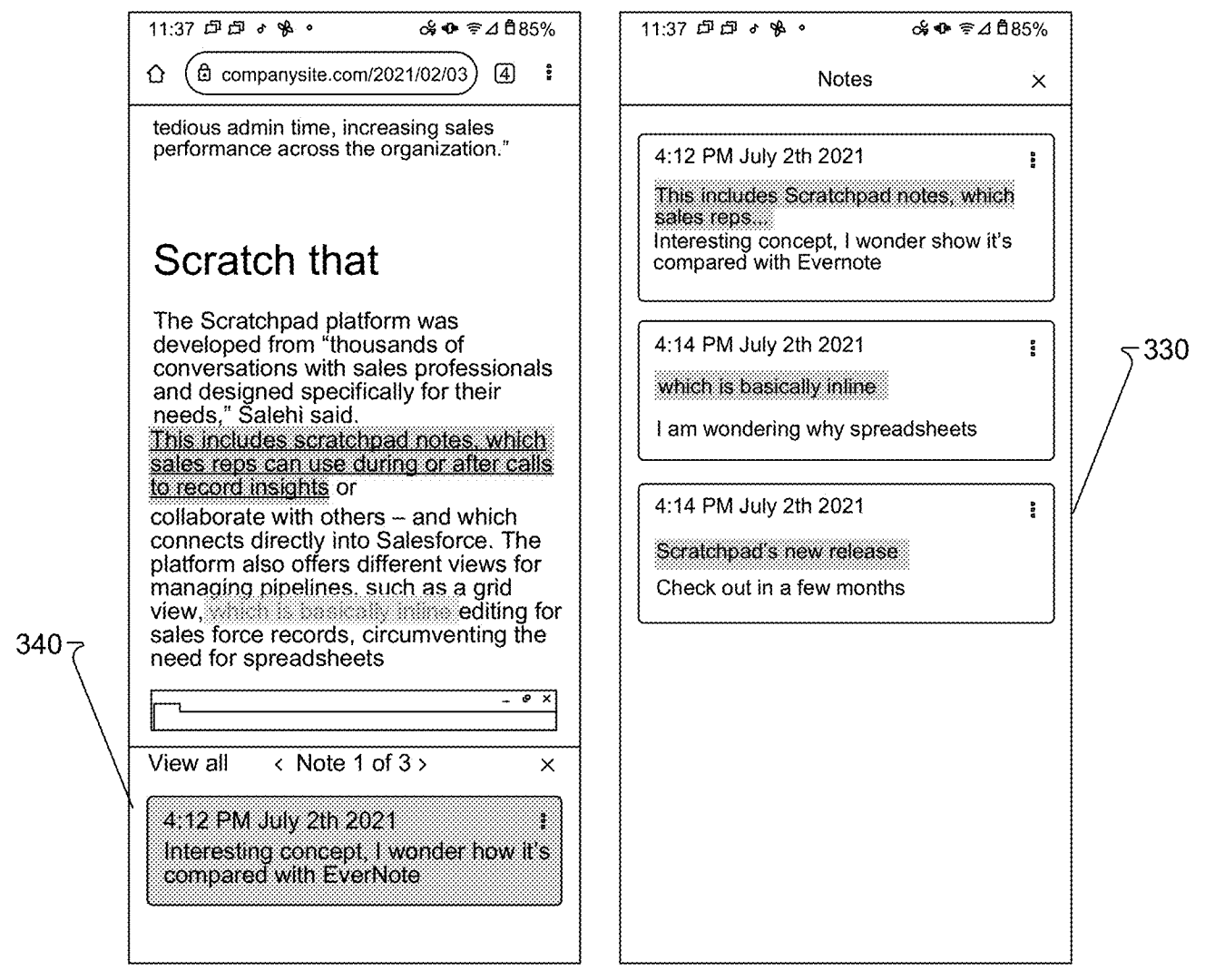

FIGS. 3A and 3B illustrate an example preview area 340 in a device with limited display area, such as a mobile device, a tablet, a wearable, etc. The preview area 340 is similar to preview area 140 of FIG. 1C. The preview area 340 may thus display a first note or annotation associated with the source document, but may be expanded to annotation area 330, as illustrated in FIG. 3B. Annotation area 330 is similar to, and/or has similar features and/or functionalities as, annotation area 130 of FIGS. 1A-2B.

Figure 4A:
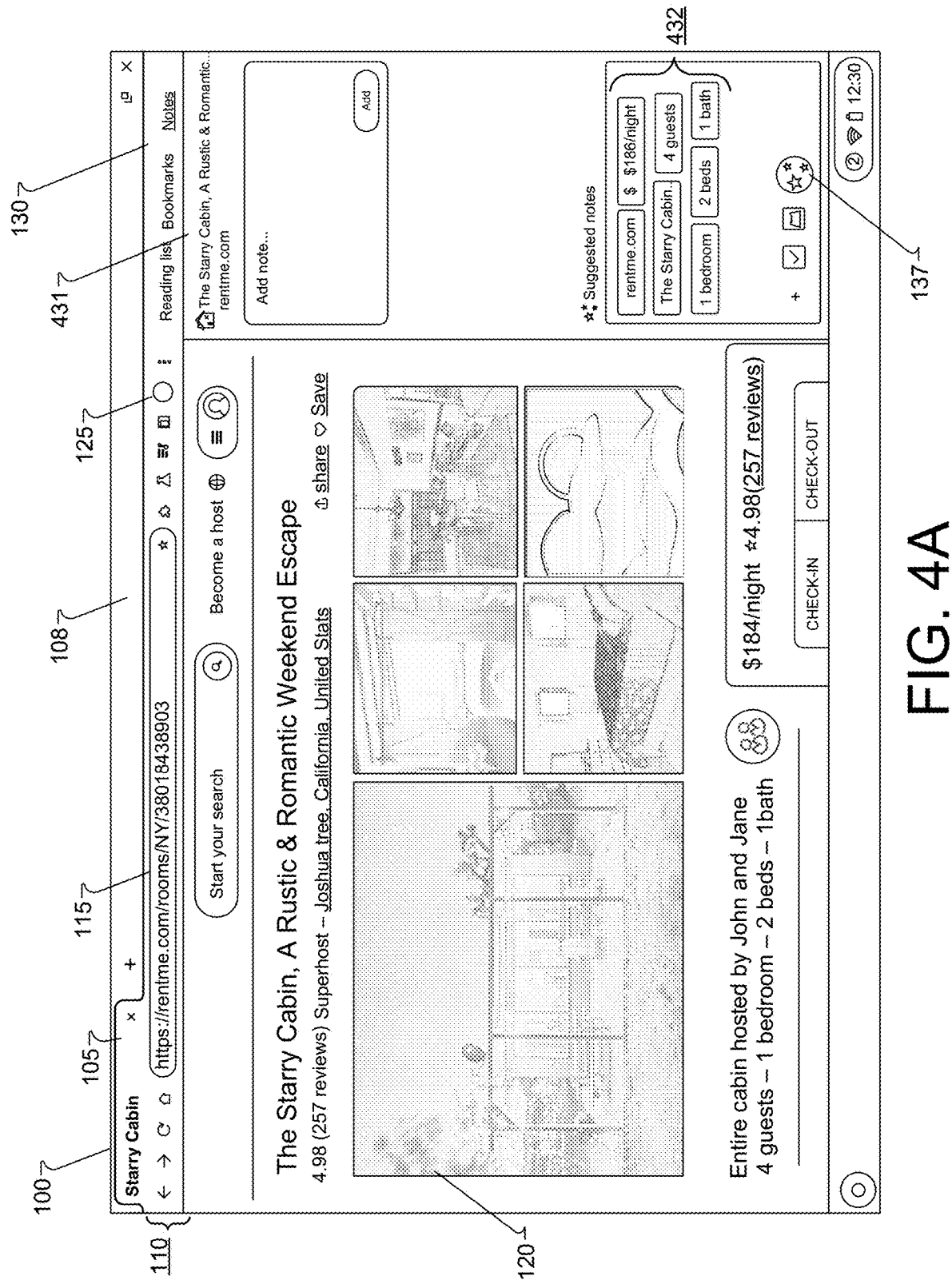
FIGS. 4A-4F illustrate example browser annotation interfaces with suggested annotation content, according to some aspects.
Figure 4B:
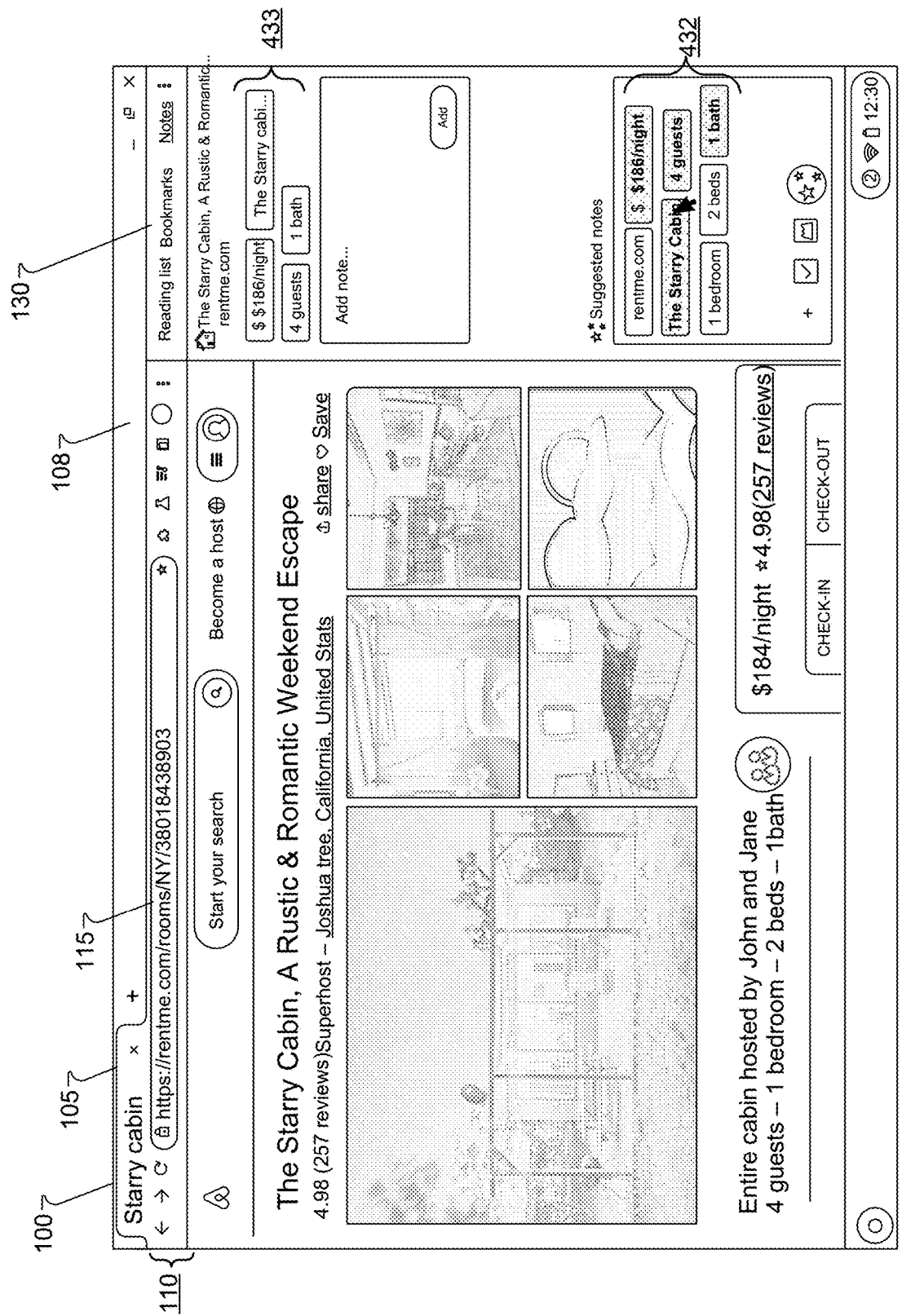

FIGS. 4A-4F illustrate example browser annotation interfaces with suggested annotation content, according to some aspects. In the example of FIG. 4A, the user has navigated to a webpage that is now at least partially displayed in browser content window 120 and opened an annotation area 130. In some implementations, the annotation area 130 may include a description 431 of the annotation target, in this case a title from the webpage displayed in the browser content window 120. In some implementations, the title is stored as a data element with an annotation record for the annotation, e.g., an annotation record stored in local note storage 726 of FIG. 7. In the example of FIG. 4A, the user has actuated the auto-suggestion control 137. In response to actuation of the auto-suggestion control 137, the annotation area 130 is updated with suggested text-based content elements 432. The suggested text-based content elements 432 are content elements selected from content of the annotation target. The auto-suggestions can be based on schema mark-up in the annotation target. The auto-suggestions can be based on historical search records. The auto-suggestions can be based on document structure of the annotation target. The user may select one or more of the suggested text-based content elements 432. In the example of FIG. 4B, the user has selected four of the suggested text-based content elements 432, as shown by the dotted backgrounds and bolded text of the four suggested text-based content elements 432 that the user selected. The dotted backgrounds and/or bolded text can represent changes in color or highlighting of the suggested text-based content elements 432. FIG. 4B illustrates four notes 433 that have been added in response to selection of the four suggested text-based content elements 432.

Figure 4C:
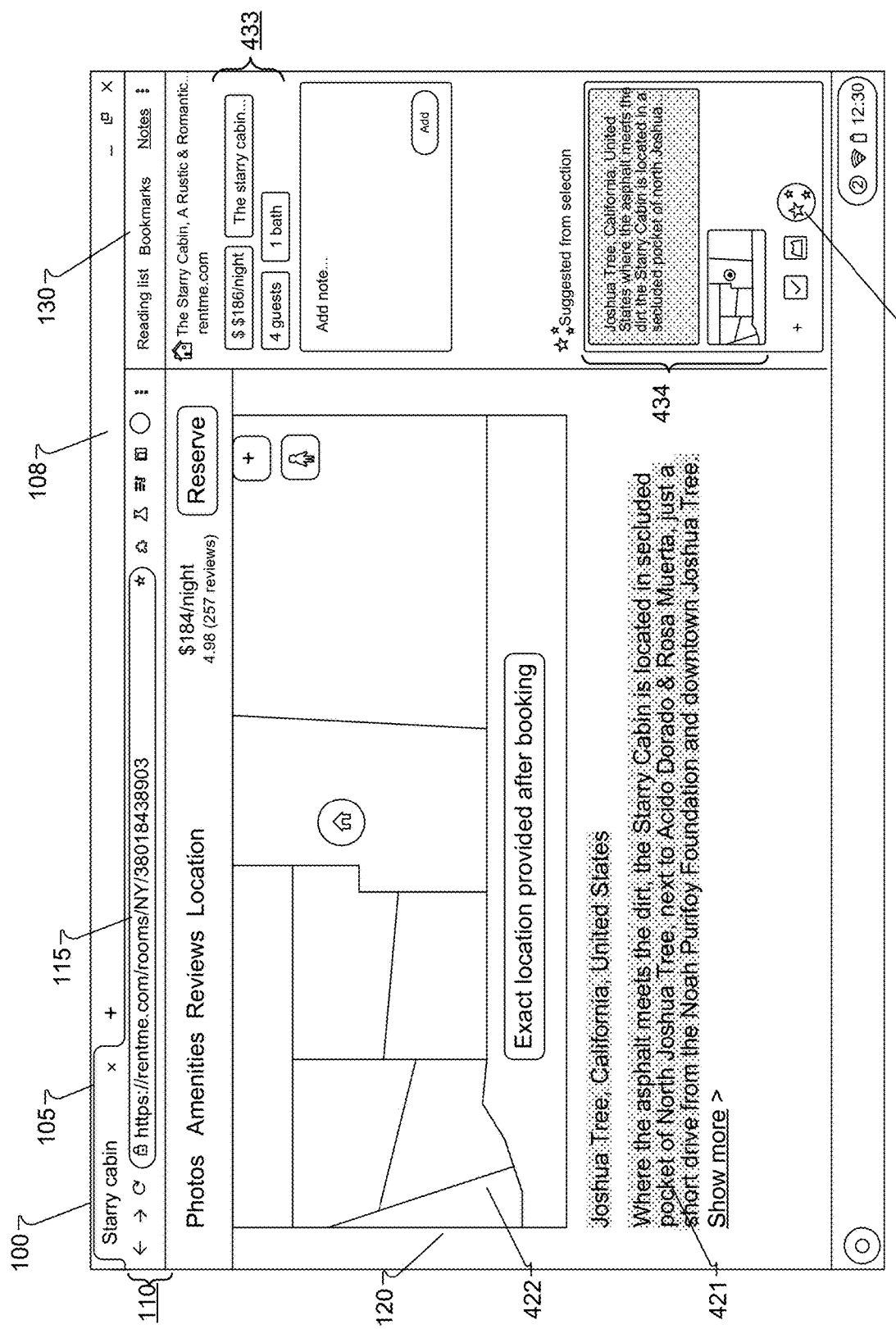
Figure 4D:
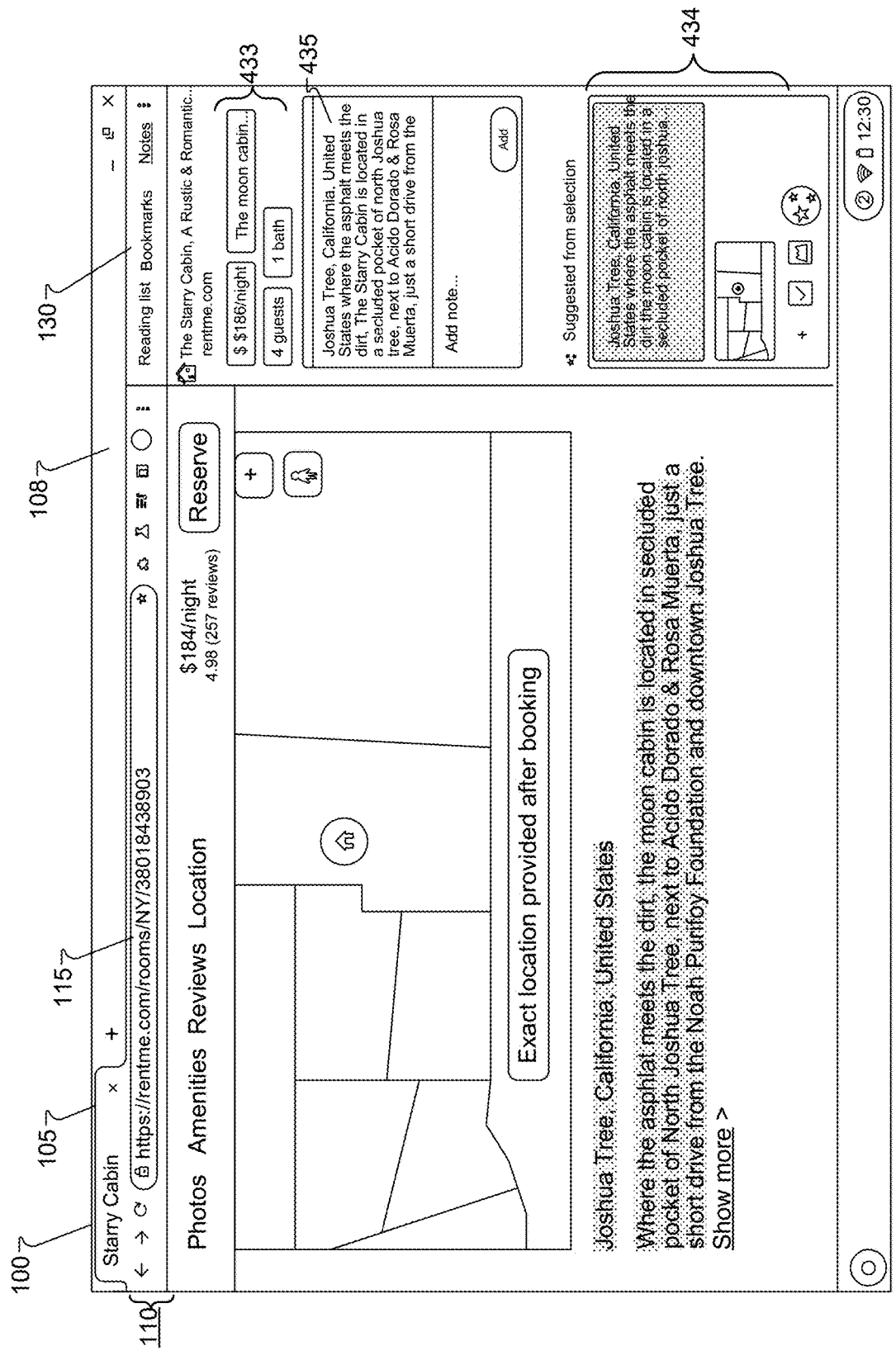

In the example of FIG. 4C, the user has scrolled to a different portion of the annotation target and modified an appearance of text 421. In this example, the modification of the appearance of text 421 includes highlighting the text 421, shown as shading in FIG. 4C. Selection of the auto-suggestion control 137 may result in auto-suggested elements 434, which include the selected highlighted text 421 and an image 422. In response to the user selecting the suggested text of the auto-suggested elements 434, FIG. 4D illustrates that the browser application has added a new note 435 and/or annotation to the annotation area 130. This new note 435 has the same annotation target as the notes 433 and/or annotations. Although not illustrated in the figures, selection of one of the notes 433 and/or annotations would cause the annotation target to scroll, so that the content corresponding to the selected note and/or annotation of the notes 433 and/or annotations is displayed in the browser content window 120, e.g., as illustrated in FIG. 4E.

Figure 4E:
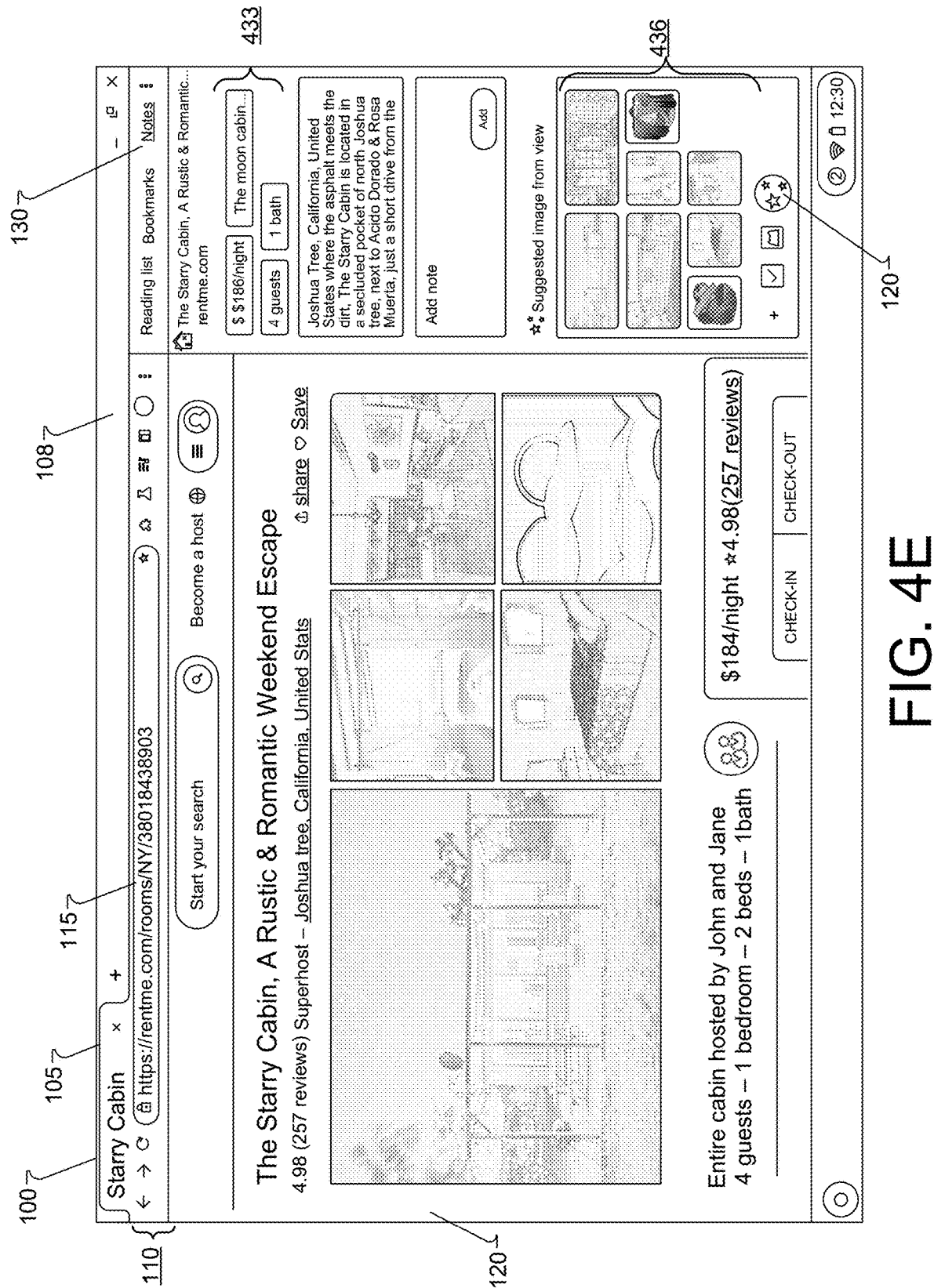
Figure 4F:
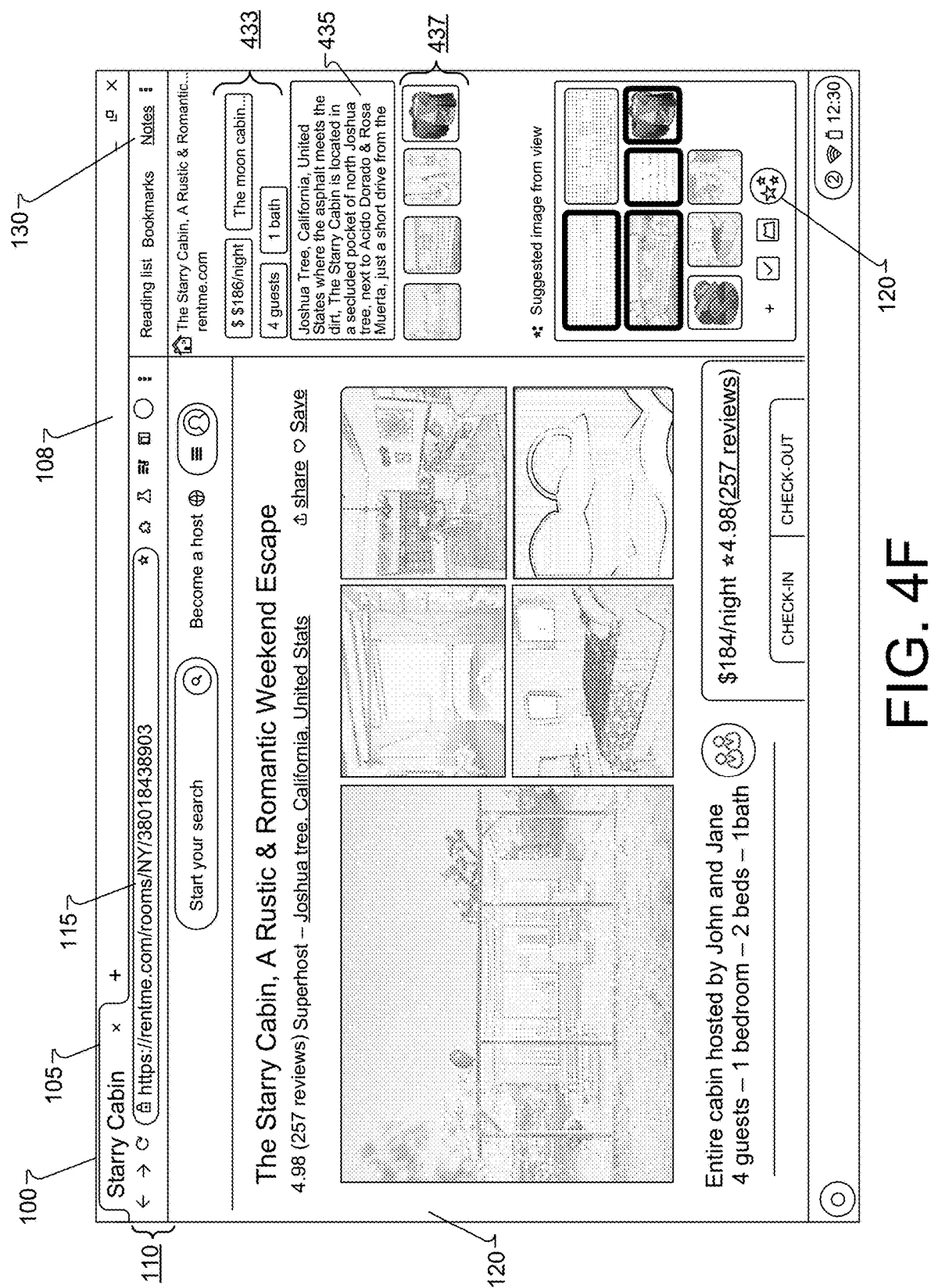

In the example of FIG. 4E, selection of the auto-suggestion control 137 may result in suggested image elements 436 being added to the annotations for the annotation target (e.g., displayed in the browser content window 120). The user can select one or more of the images, which can then be added as image notes 437 and/or image annotations to the annotations for the annotation target, as illustrated in FIG. 4F. In some implementations, the suggested text-based content elements 432 and the auto-suggested elements 434 are selectable elements. These selectable elements may be configured, in response to selection, to add the suggested annotation content as an annotation, as described above.

Figure 5A:
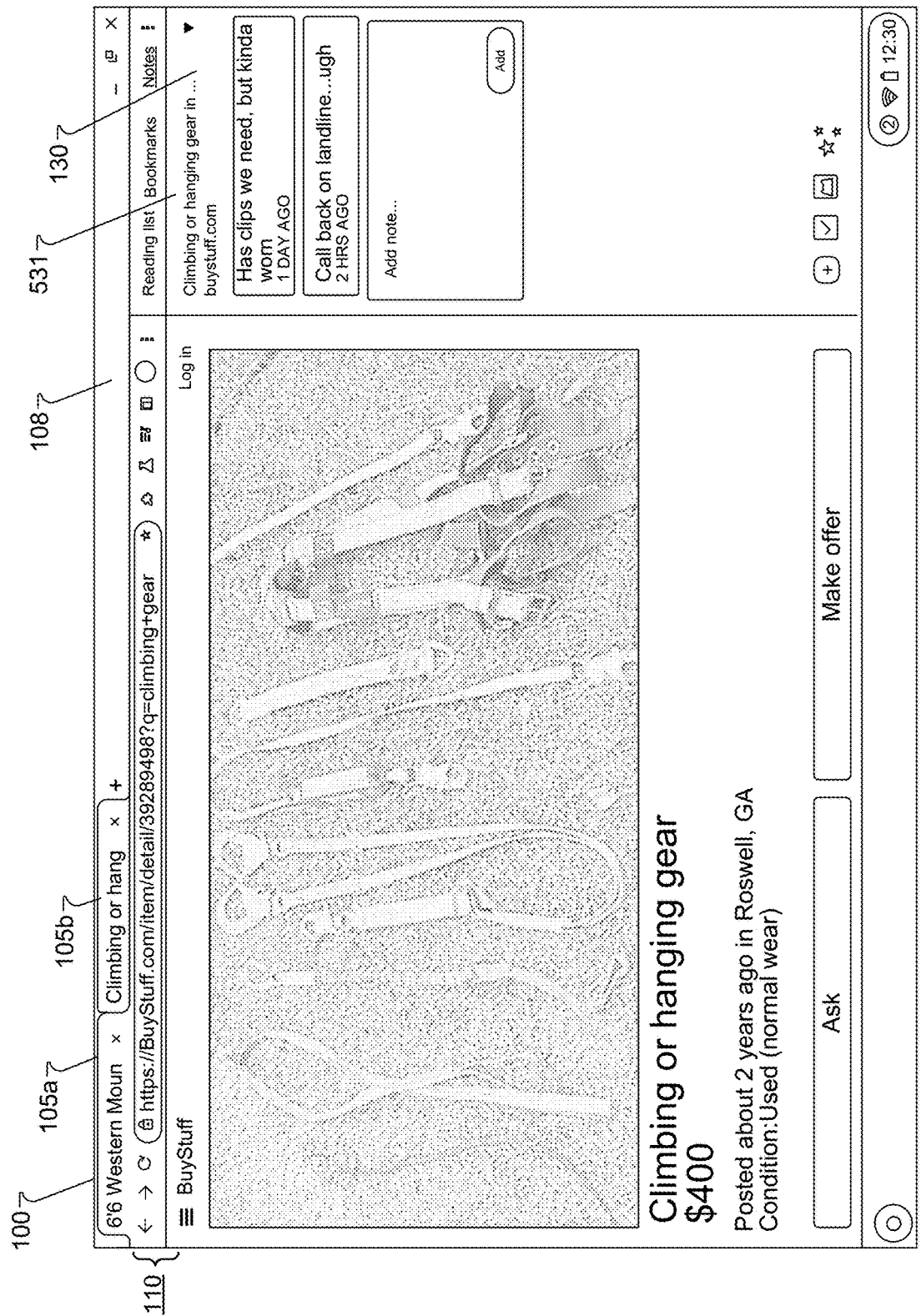
Figure 5B:
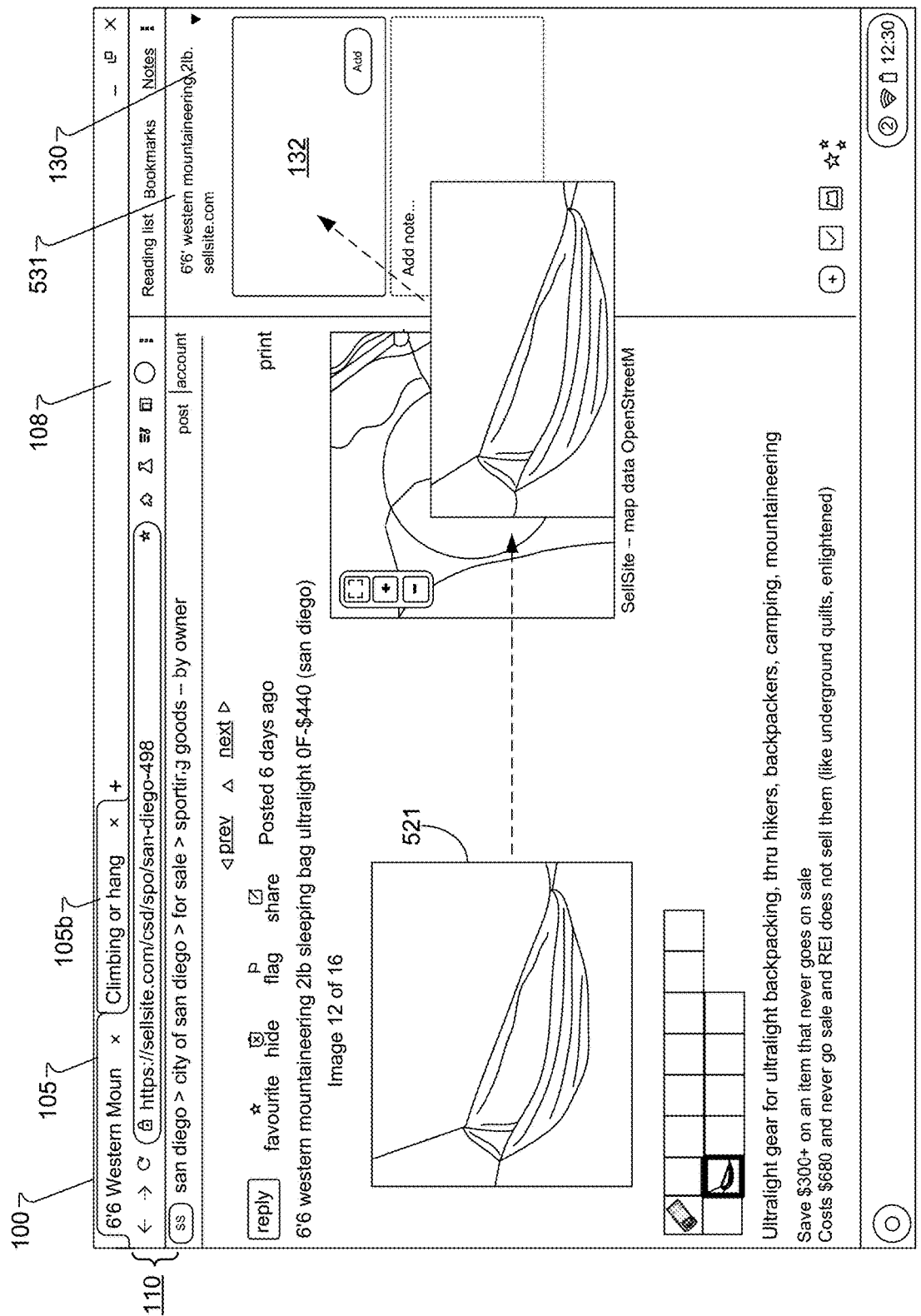
Figure 5C:
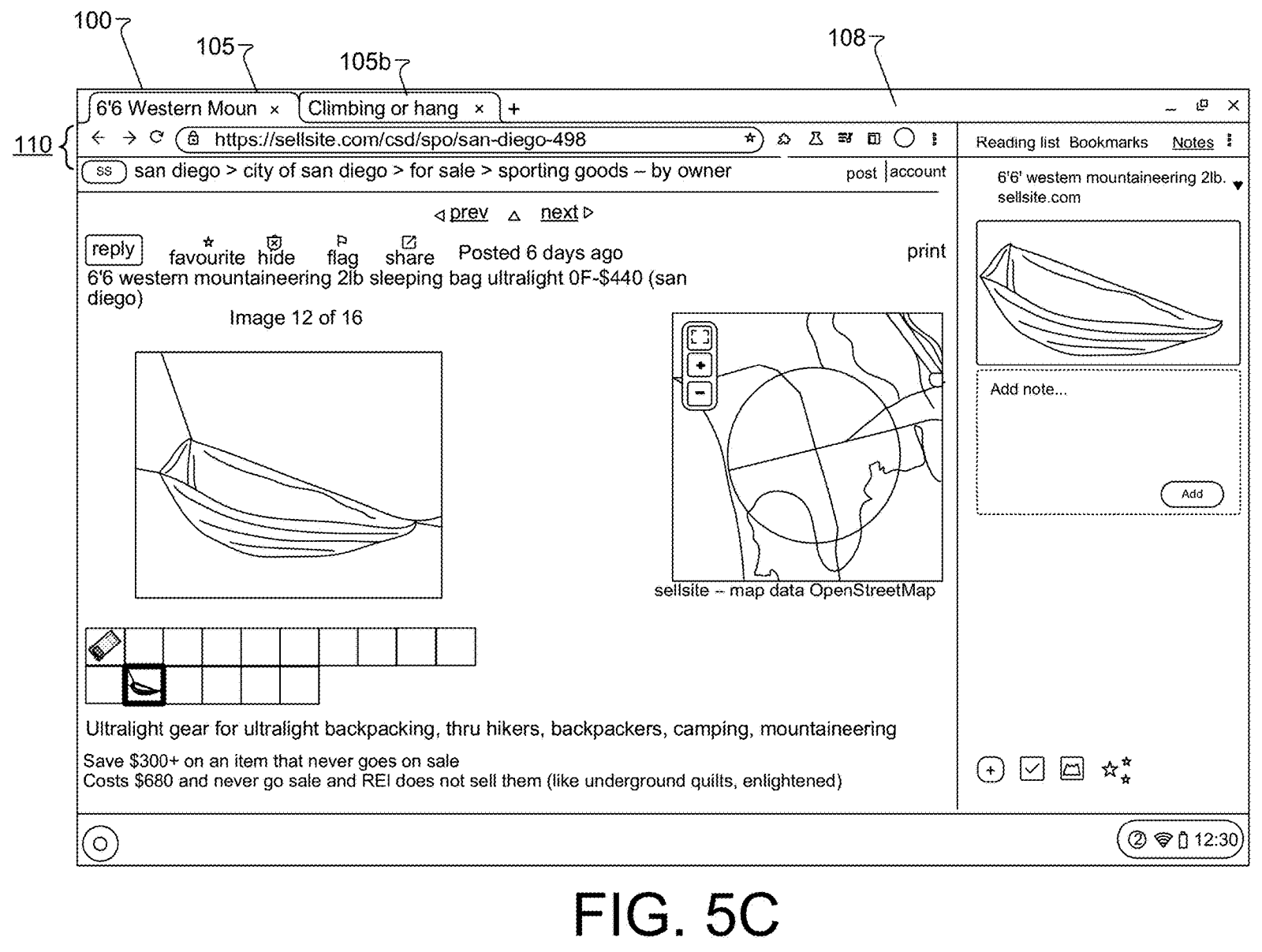

FIGS. 5A-5D illustrate an example browser annotation interface with grouped annotation content, according to some aspects. In the example of FIG. 5A, the user has two open tabs 105 (e.g., 105a and 105b). The user has an annotation area 130 open, with two notes for the annotation target of the website corresponding to tab 105b, as evidenced by the description 531 of the annotation target included in the annotation area 130. The user may select tab 105a, which causes the browser application to display the interface of FIG. 5B. The browser responds to the selection of the tab 105a by presenting, in the annotation area 130, annotations for an annotation target that corresponds to the resource address (e.g., the URL) associated with the selected tab 105a. The annotation target now corresponds to the website associated with tab 105a, and the annotation area 130 indicates this change by changing the description 531. In the example of FIG. 5B, the current annotation target has no existing annotations and/or notes, but the user may create an annotation and/or note that is an image included in the webpage by dragging image 521 to the new note UI element 132, as illustrated with dashed arrows in FIG. 5B. In addition to being a text-based UI element (e.g., configured to receive text), the new note UI 132 can be configured as a drop location. Thus, if content such as an image, copied text, or some other content is dragged and released over (fully or partially over) the new note UI element 132 included in the annotation area 130, the browser application may consider the drag and/or drop of the content to be a request to store the content as a new annotation and/or note for the annotation target (e.g., the annotation target corresponding to the description 531). FIG. 5C illustrates the result of this request, e.g., the browser application has added a new image as an annotation for the annotation target. When the annotation is an image, the image may be downloaded to the user's device so that the note may be accessible to the user without a network connection.

Figure 5D:
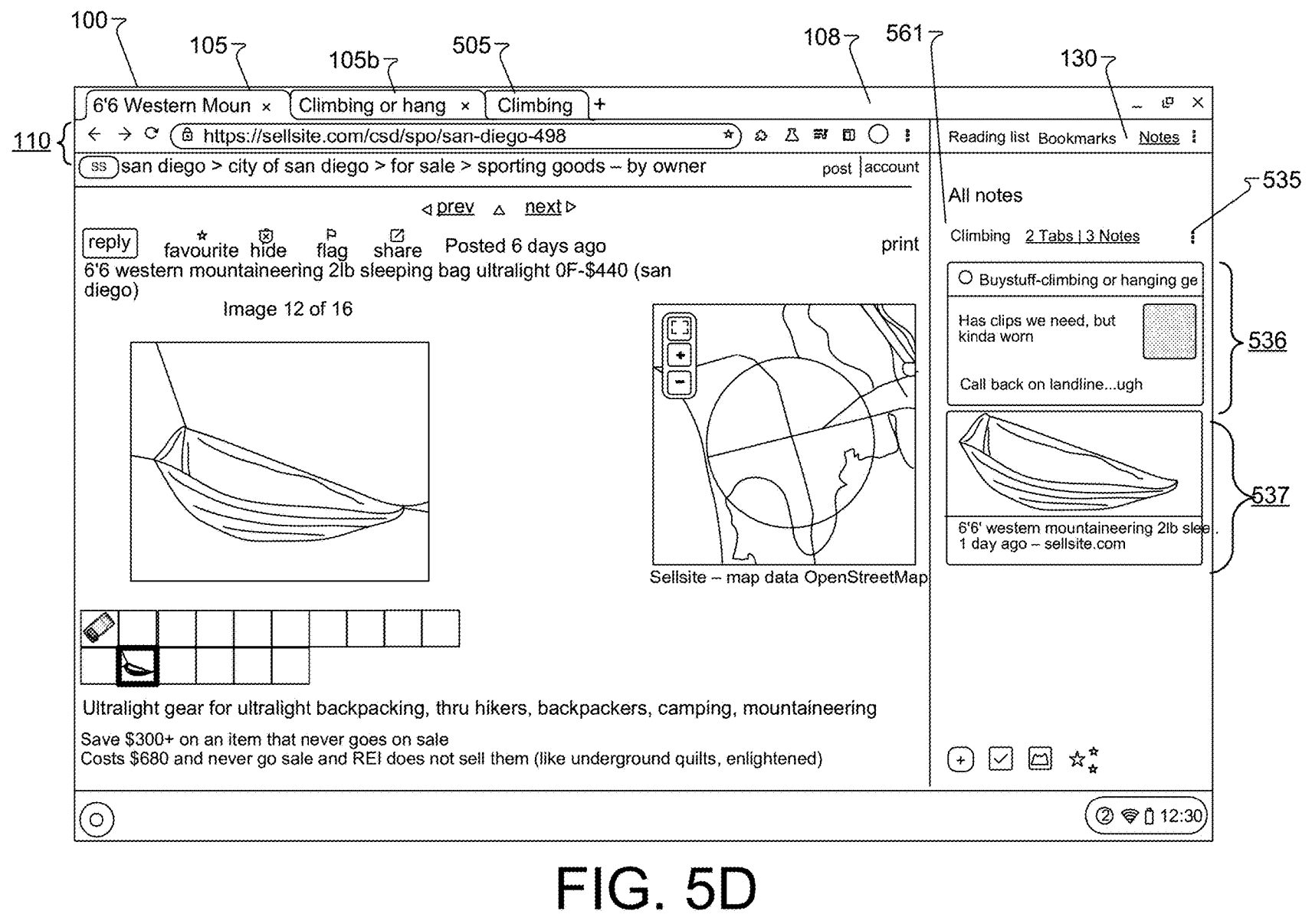

In some implementations, the user may create a tab group by grouping the two tabs 105*a* and 105*b* into a tab group 505, as illustrated in FIG. 5D. The user may have given the tab group 505 a description of "Climbing". A tab group can also be an annotation target. In some implementations, the creation of the tab group 505 may cause the browser application to group existing annotations for annotation targets included in the tab group to also be associated with the tab group as an annotation target. This can be done directly (e.g., adding an index entry associating the annotation data with an identifier for the tab group) or indirectly (e.g., adding an index entry associating the webpage with the tab group). The annotation area 130 may be updated to reflect the new association, e.g., changing the description 531 in the annotation area 130 to a description for the tab group 505. An annotation target that represents a group of annotation targets may include additional information, such as the number of annotation targets (in this example two tabs) and/or the number of notes and/or annotations for the group of annotation targets. In some implementations, the annotation area 130 may add a group control 535, which may enable a user to select between annotation targets in the group in response to actuation of the control 535. The annotation area 130 for an annotation target representing multiple annotation targets (such as tab group 505) can display annotations associated with one or more of the annotation targets. In the example of FIG. 5D, the annotation data for tab 105*a* and for tab 105*b* are both displayed (rendered) in the annotation area 130.

Figure 6:
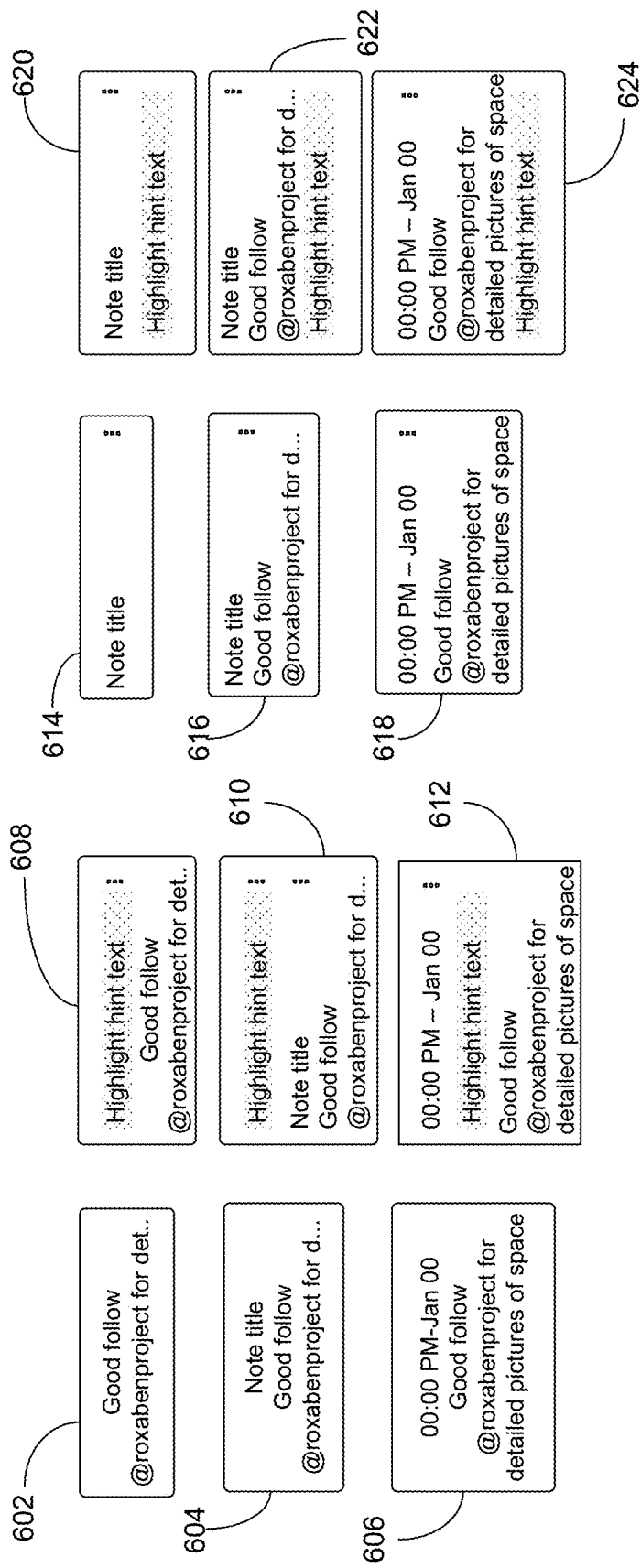
FIG. 6 illustrates example annotation renderings, according to some aspects.

FIG. 6 illustrates example variations of annotation renderings, according to some aspects. The example variations could be applied to any notes (annotations) displayed in the annotation area 130 of any of the preceding figures. Shaded backgrounds represent highlighted areas and/or highlighting of text. The example annotation 602 includes text but no title. The example annotation 604 includes a title ("Note title") and text. The example annotation 606 includes a time and date (timestamp), indicating when the annotation 606 was inputted by the user, and text. The example annotation 608 includes text for which an appearance has been modified, such as highlighted ("Highlight hint text") and additional text. The example annotation 610 includes text for which an appearance has been modified, such as highlighted ("Highlight hint text"), a title, and additional text. The example annotation 612 includes text for which an appearance has been modified, such as highlighted ("Highlight hint text"), a title, a time and date (timestamp), and additional text. The example annotation 614 includes a title. The example annotation 616 includes a title and text. The example annotation 618 includes a date and time (timestamp) and text. The example annotation 620 includes a title and includes text for which an appearance has been modified, such as highlighted. The example annotation 622 includes a title, unmodified text, and text for which an appearance has been modified, such as highlighted. The example annotation 624 includes a time and date (timestamp), text, and text for which an appearance has been modified, such as highlighted.

Figure 7:
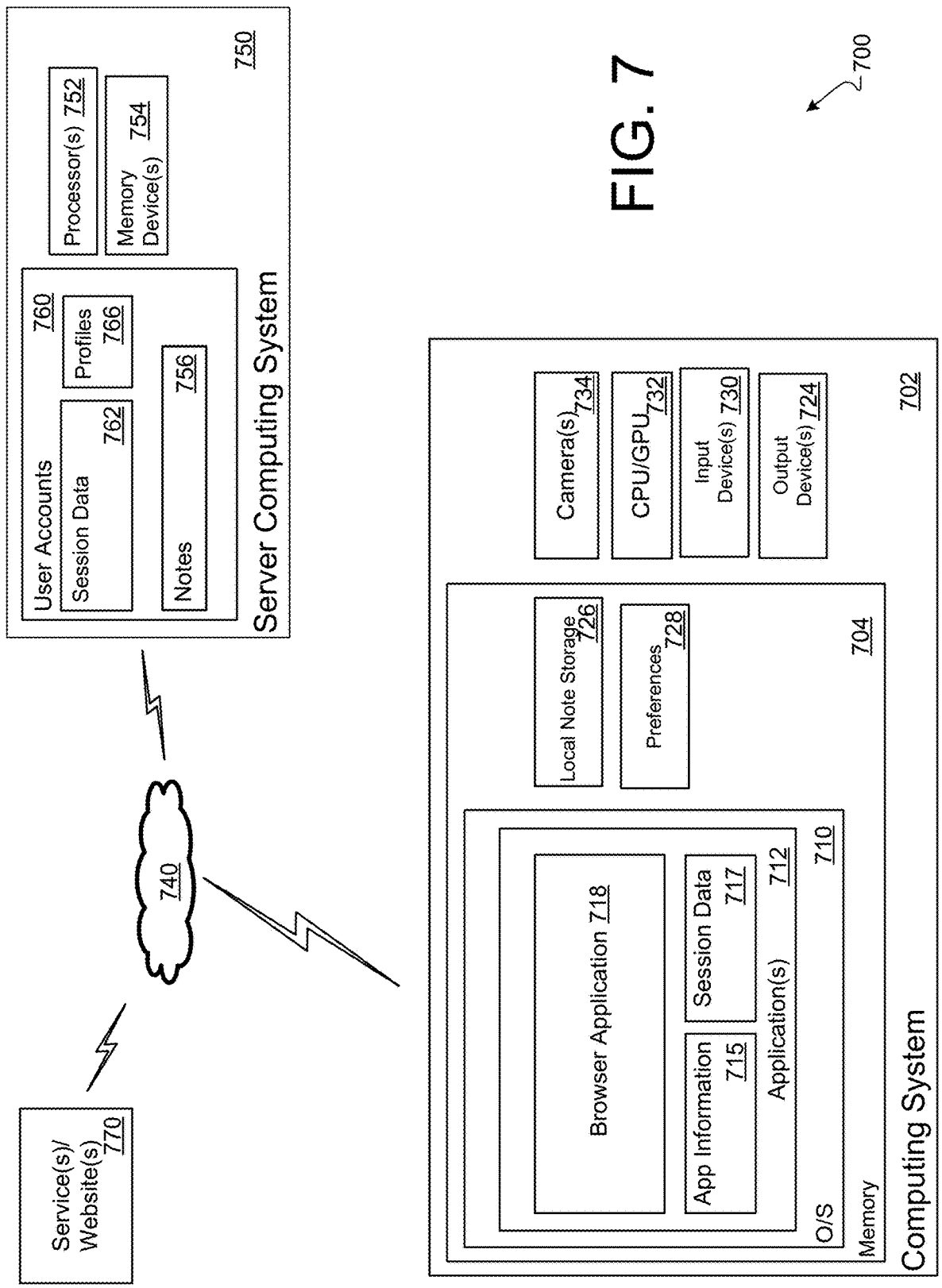
FIG. 7 illustrates a system for providing a browser annotation interface, according to an aspect.

FIG. 7 illustrates a system 700 for providing a browser annotation interface, according to an aspect. The browser annotation interface can include the browser user interface 100 and/or annotation area 130.

The system 700 can include a computing system 702. The computing system 702 can include a local computing device and/or client device, such as smartphone, tablet, mobile computing system, laptop or notebook computer, or desktop computer, as non-limiting examples.

The computing system 702 can include memory 704. The memory 704 can include a non-transitory computer-readable storage medium comprising instructions stored thereon that, when executed by at least one processor (such as the CPU/GPU 732 included in the computing system 702), are configured to cause the computing system 702 to perform any combination of methods, functions, and/or techniques described herein.

The memory 704 can include instructions for executing an operating system (O/S) 710. The operating system 710 can control which applications have access to various components of the computing system 702, such as the memory 704, output device(s) 724, input device(s) 730, CPU/GPU 732, and/or camera(s) 734.

The operating system 710 can enable multiple application (s) 712 to execute on the computing system 702, such as the browser application 718. The browser application 718 can perform any combination of methods, functions, and/or techniques described herein. For each application 712, the operating system 710 can maintain and/or store application information 715 and/or an application layer, which can enable the application 712 to communicate with other applications executing on the computing system 702. For each application 712, the operating system 710 can maintain and/or store session data 717, which can enable opening, closing, and managing a session between application processes.

The memory 704 can include local note storage 726. The local note storage 726 can store notes and/or annotations, such as the annotations described above and shown in previous figures. The local note storage 726 can store the notes and/or annotations in annotation records. In some implementations, the annotation records can include a user identifier. In some implementations, the location (directory) in which an annotation record is stored reflects association with a particular user. Each annotation record may include a metadata portion, a body portion, and a target portion. The metadata portion of an annotation record can include an identifier, a creation date, a modified date, etc. The identifier enables the browser to uniquely identify each annotation record. The ID can be unique by user. The ID can be unique by client device. In some implementations, a body of the annotation record can include a note type indicating a type of the annotation. In some implementations, the metadata portion of an annotation record can include a note type. The note type may identify the type of annotation, e.g., metadata such as text, image, rich text, handwriting, audio, video, location, geolocation, and/or files. The target portion includes an annotation target identifier. The annotation target identifier identifies the resource, e.g., webpage, website, document, file, tab group, etc., to which the annotation applies. The annotation target identifier can be a resource address such as a URL. The annotation target identifier can be a group identifier, e.g., an identifier for a tab group. The body portion of an annotation record can include text. In some examples, the body portion of the annotation record can include an address such as a URL linking to and/or identifying an external source of information and/or data. The text represents the text selected/provided by the user as the annotation. The body portion of an annotation record can include an image identifier. For annotations that are tied to a particular element of the annotation target (e.g., particular text, a particular image, etc.), the metadata portion of the annotation record can include an annotation target element. In some examples, the annotation target element can be included in the annotation record. The annotation target element can be a selector, e.g., a CSS selector, that identifies particular content in the annotation target. In some examples, the annotation target element can include a portion of text included in the webpage. In some examples, the annotation target can identify a file (such as an image), and/or an identifier of the annotation target can include a filename and/or a hash value associated with the file. The hash value can be determined based on any hashing algorithm, such as Message Digest 5 (MD5) or Secure Hash Algorithm (SHA).

The local note storage 726 can store the notes and/or annotations in association with the address and/or group as well as in association with a user account, such as the user account associated with the user who created the notes and/or annotations. In some examples, the notes and/or annotations can be considered to be stored in association with the user account when the notes and/or annotations are stored in a directory associated with the user, such as a local directory accessible to the user. The notes and/or annotations can be stored locally on the memory 704 of the computing system 702 on which the browser application is executing. The notes and/or annotations can be stored locally in long-term storage, such as non-volatile memory that will still be accessible after the computing system is powered off and then back on. In some examples, the rendered webpage is not stored in long-term memory, and the notes and/or annotations can be retrieved and presented when the rendered webpage is again retrieved from the service(s)/website(s) 770 and rendered on the browser application 718. Local storage of the notes and/or annotations prevents the server that hosts the websites associated with the notes and/or annotations from having knowledge of the notes and/or annotations.

The memory 704 can store preferences 728. Preferences 728 can be received from a user, and can include appearance of the web browser, favorite sites or bookmarks, and/or initial applications to launch, as non-limiting examples.

The computing system 702 can include one or more camera(s) 734. The camera(s) 734 can capture images, such as images of the user for teleconferencing.

The computing system 702 can include at least one processor, such as a central processing unit (CPU) and/or graphics processing unit (GPU) 732. The CPU/GPU can execute instructions such as instructions stored in memory 704, to perform any combination of methods, functions, and/or techniques described herein.

The computing system 702 can include one or more input device(s) 730. The input device(s) can include human interface devices, such as a keyboard, mouse, microphone, or touchscreen, as non-limiting examples.

The computing system 702 can include one or more output device(s) 724. The output device(s) can include output devices such as a display, speaker, or printer, as non-limiting examples.

The input device(s) 730 and/or output device(s) 724 can also include interfaces for communicating with other computing devices. The interface(s) for communicating with other computing devices can receive and/or send data, such as from and/or to, a server, and/or may receive input and provide output from and to a user. The input and output functions of the interface(s) may be combined into a single node, or may be divided into separate input and output nodes. The input/output node can include one or more wired or wireless interfaces for communicating with other computing devices.

The system 700 can include a server computing system 750. The server computing system 750 can store and/or maintain user accounts 760. User accounts 760 stored and/or maintained by the server computing system 750 can be associated with and/or owned by users, and can be associated with unique identifiers, such as email addresses. The server computing system 750 can store notes 756 and/or annotations in association with each user account. The notes 756 and/or annotations can have features described above, and can be stored in association with the user account 760 and an annotation target, such as a URL. The server computing system 750 can prevent a server that hosts and/or maintains a resource associated with the annotation target, such as a server(s)/website(s) 770, from accessing the notes 756 and/or annotations.

The server computing system 750 can store, in association with the user accounts 760, session data 762, which can enable opening, closing, and managing a session during which the user is logged in with the user's user account 760. The server computing system 750 can store, in association with the user accounts 760, profiles 766, which can include browsing patterns, bookmarks, and/or preferences with respect to appearance.

The server computing system 750 can include at least one processor(s) 752. The at least one processor(s) 752 can execute instructions, such as instructions stored in at least one memory device(s) 754, to cause the server computing system 750 to perform any combination of methods, functions, and/or techniques described herein.

The server computing system 750 can include at least one memory device(s) 754. The at least one memory device(s) 754 can include a non-transitory computer-readable storage medium. The at least one memory device(s) 754 can store data and instructions thereon that, when executed by at least one processor, such as the processor(s) 752, are configured to cause the server computing system 750 to perform any combination of methods, functions, and/or techniques described herein. Accordingly, in any of the implementations described herein (even if not explicitly noted in connection with a particular implementation), software (e.g., processing modules, stored instructions) and/or hardware (e.g., processor, memory devices, etc.) associated with, or included in, the server computing system 750 can be configured to perform, alone, or in combination with computing system 702, any combination of methods, functions, and/or techniques described herein.

The system 700 can include service(s)/websites 770. The service(s)/website 770 can be maintained and/or hosted by one or more remote servers. The service(s)/website 770 can be addressed by, and/or store files addressed by, resource addresses, e.g., URLs. The computing system 702, server computing system 750, and/or service(s)/website 770 can communicate with each other via a network 740, such as the Internet.

Figure 8:
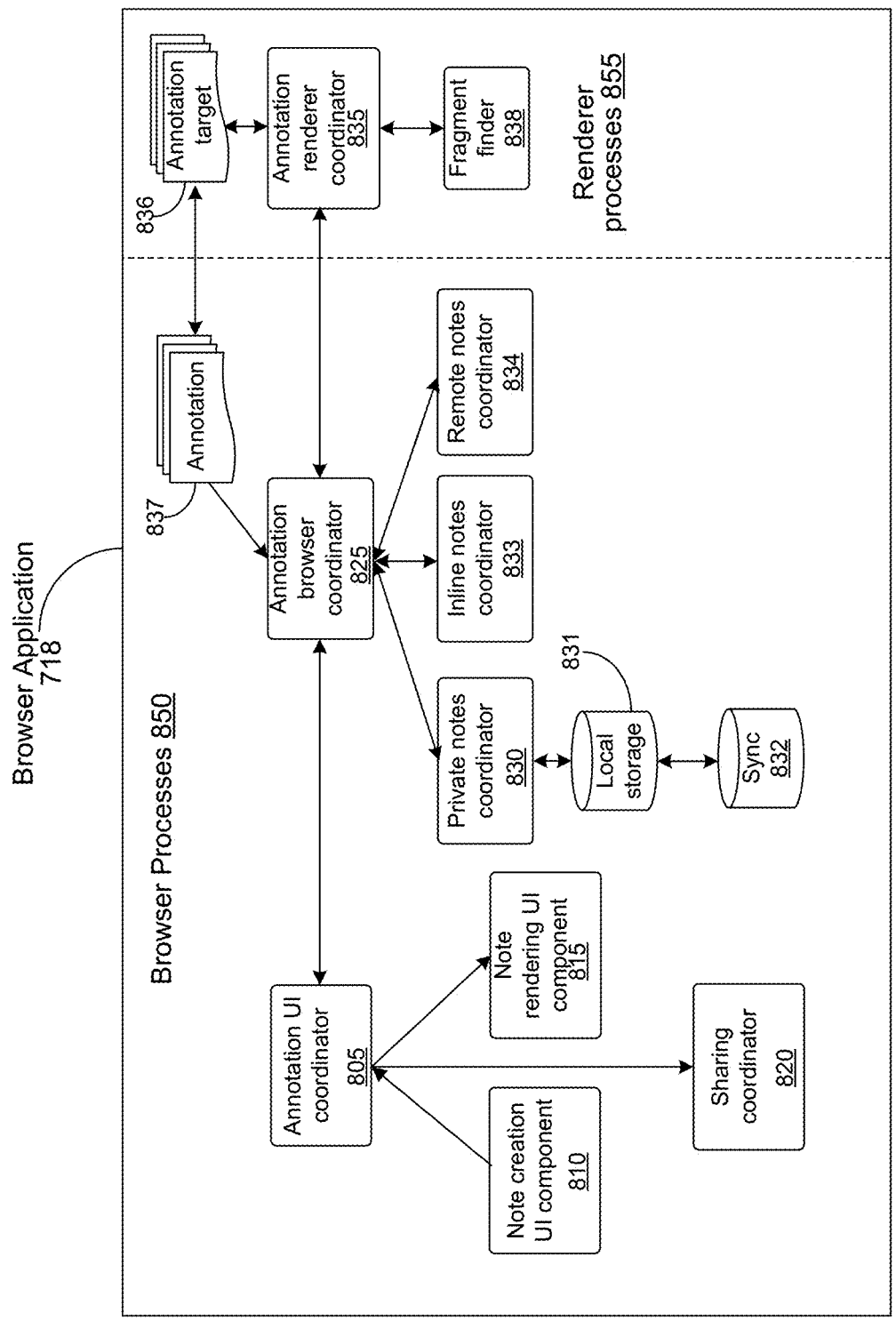
FIG. 8 is a block diagram of components for a browser application that implements a system for providing a browser annotation interface, according to an aspect.

FIG. 8 is a block diagram of components for a browser application, e.g., browser application 718 of FIG. 7, that implements a system for providing a browser annotation interface, according to an aspect. The browser application 718 includes an annotation UI coordinator 805 that is a platform-specific component of the browser processes 850. In other words, the annotation UI coordinator 805 is configured for specific operating systems and device types. The annotation UI coordinator 805 may have two main components: note creation UI 810 and note rendering UI 815. The note creation UI 810 includes components configured for adding new notes and/or annotations 837 and associating the new notes and/or annotations 837 with an annotation target 836 (e.g., the source document or tab group). Example note creation UI 810 components include 132-137 of FIG. 1A, and/or the suggested elements 432, 434, 436 of FIGS. 4A-4F, etc. The note rendering UI 815 is configured to render the annotation area (e.g., annotation area 130) and/or preview area (e.g., preview area 140) in which the notes and/or annotations 837 are displayed. In some implementations, the annotation UI coordinator 805 may also include a note sharing coordinator 820. The annotation UI coordinator 805 may communicate with an annotation renderer coordinator 835, e.g., sending an identifier of an annotation 837 to the annotation renderer coordinator 835. In response to receiving the identifier of the annotation 837 from the annotation UI coordinator 805, the annotation renderer coordinator 835 may identify content of the annotation source associated with the annotation identifier and display (render) that portion of the annotation target 836 in the browser content window 120. In some implementations, the message may be passed through an annotation browser coordinator 825.

The browser application 718 may include the annotation browser coordinator 825. The annotation browser coordinator 825 is a cross-platform component (i.e., not dependent on an operating system) of the browser processes 850 that contains the business logic of the application. The annotation browser coordinator 825 also maintains the annotations data in private storage (e.g., local to the computing device on which the browser application 718 is executing). In some examples, the annotations data itself may be kept out of the renderer processes 855. In other words, annotation data is rendered in a rendering process distinct from the renderer processes 855 and the annotation data is not provided to the annotation renderer coordinator 835 or to another renderer process. This separation of rendering processes provides security and ensures privacy. For example, the renderer processes 855 (e.g., annotation renderer coordinator 835) may receive an ID for an annotation and information about the annotation target 836 (e.g., what to fully highlight, what to partially highlight, etc.). This reduces the risk of an exploited renderer exposing confidential user data in the annotations themselves. In some implementations, where the user requests it, annotations 837 may be synchronized with a user account, e.g., so that if the user uses multiple computing devices, the annotations data for the user can be accessed by any of the computing devices after the user logs into the user account. The user may stop synchronization at any time.

In some implementations, the locally stored annotation data (which can represent an annotation 837) may have a format based on the Web Annotation W3C Recommended Web Annotation Data Model. The annotation data may be comprised of three main parts: a metadata portion, a body portion, and target portion. The metadata portion may contain information like the ID, creation date, modified date, etc. The ID can be used to communicate about a specific annotation between the annotation UI coordinator 805, the annotation renderer coordinator 835, and the annotation browser coordinator 825. The body portion of an annotation 837 includes the text, images, rich text, link, etc. of the annotation 837. The body portion of an annotation 837 is not shared with the rendering processes. The annotation target 836 (target portion) defines what the annotation 837 attaches to. The annotation target 836 can be a webpage element, a webpage, a tab group, a topic (a user-defined group), etc. In some implementations, in addition to the webpage as an annotation target 836, annotation target elements are associated with the annotation 837. The annotation target elements may be identified via selectors. A selector can be a Text Fragment selector and/or fragment finder 838. A selector and/or fragment finder 838 can be a CSS selector. Because annotations 837 can be linked to elements of a webpage, which may change, it is possible that the annotation renderer coordinator 835 may not be able to find the specific annotation target element. In some implementations, these "orphaned" notes and/or annotations may still be displayed in the annotation area 130 for the webpage. In some implementations, such orphaned annotations may be displayed with an additional message mentioning that the target element can no longer be found. If the webpage associated with the Uniform Resource Locator (URL) is unattainable, annotations 837 for that annotation target 836 may be shown as orphaned notes and/or annotations in the annotation area 130. For example, a notes menu option, such as menu option 124, may enable the user to select notes and/or annotations for an annotation target 836 that is not associated with an open tab.

Figure 9:
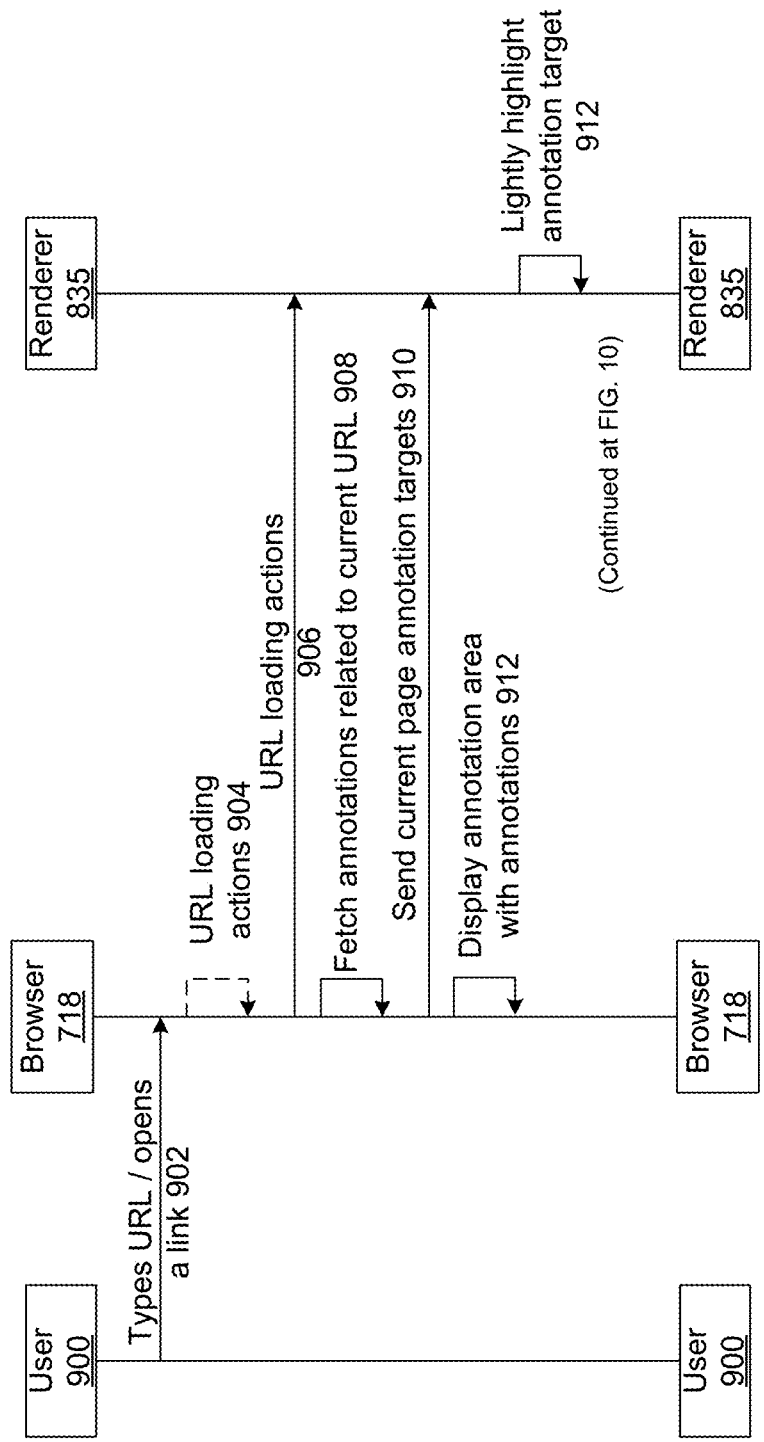
FIG. 9 is a timing diagram depicting example operations for loading an Internet document with annotations, according to an aspect.

The annotation browser coordinator 825 may fetch the relevant annotations 837 for the current pages from the local storage, as described in more detail with respect to FIG. 9. The annotation browser coordinator 825 may interact with the annotation UI coordinator 805 and the annotation renderer coordinator 835 to properly display the notes and/or annotations. The annotation browser coordinator 825 may determine which tasks to send to the annotation UI coordinator 805 and which tasks to send to the annotation renderer coordinator 835.

The annotation browser coordinator 825 may include a private notes coordinator 830. The private notes coordinator 830 may be configured to save and retrieve annotation data (notes and/or annotations) from local storage 831. The local storage 831 can be included in memory 704 of the computing system 702 on which the browser is executing. The private notes coordinator 830 may associate the annotations with the annotation target (e.g., source document or tab group) to which the note is tied. The notes coordinator 830 may index the annotation data, e.g., so that it can be retrieved by an annotation target, by a tab group, by a topic, etc. The notes coordinator 830 may also be configured to sync 832 the annotation data for access on other devices if the user is signed-in and syncing.

The annotation browser coordinator 825 may include an inline notes coordinator 833. The inline notes coordinator 833 can receive, store, retrieve, and/or present notes and/or annotations within the annotation target 836 and/or webpage, rather than within the annotation area 130.

The annotation browser coordinator 825 may include a remote notes coordinator 834. The remote notes coordinator 834 may receive, store, retrieve, and/or present notes and/or annotations that are stored remotely in association with the user account, such as in the notes 745 of the server computing system 750.

The annotation renderer coordinator 835 may be configured for finding and highlighting the selectors to which the different annotations are attached. To do so, the annotation renderer coordinator 835 may keep a subset of the annotations data like the ID and selector information. The annotation browser coordinator 825 may cause the annotation renderer coordinator 835 and annotation UI coordinator 805 to work in tandem to fluidly link the annotation 837 to its target selector using an Annotations ID (GUID) to synchronize operations. Specifically, the annotation UI coordinator 805 is responsible for the annotation body (though it has all of the data) and the annotation renderer coordinator 835 is responsible for the annotation target 836 (what is rendered in the browser content window 120). In some implementations, annotations 837 may not be rendered next to the highlighted text. In some implementations, annotations 837 may be rendered next to the highlighted text. In some implementations, when the user clicks on an annotation 837 in the side-panel (e.g., annotation area 130), the annotation browser coordinator 825 may cause the annotation renderer coordinator 835 to emphasize the annotation target's 836 highlight and scroll the annotation target's 836 highlight into view. However, when a user clicks on a lightly highlighted (partial highlight) annotation target 836 (e.g., in the browser content window 120), the annotation browser coordinator 825 may cause the annotation UI coordinator 805 to focus the associated annotation in the side-panel (annotation area 130). To make this work, messages between the processes will include the ID of the selected annotation so that the other process can activate the appropriate annotation.

FIG. 9 is a timing diagram depicting example operations for loading an Internet document with annotations, according to an aspect. A user 900 selects a webpage, such as by typing a resource address, such as a URL into the address input area 115 and/or selecting or opening a hyperlink (902) presented in the browser content window 120. The browser application 718 responds to the selection of the webpage by performing URL loading actions (904), (906). The URL loading actions (904), (906) can include generating and sending, to a server such as the server maintaining the service(s)/website(s) 770, a request, such as an HTTP GET request, for the webpage identified and/or addressed by the URL. The browser application 718 can, in conjunction with the annotation renderer coordinator 835, render and present the webpage received from the server.

After performing the URL loading actions (904), (906) such as receiving and rendering the web page, the browser application 718 can fetch annotations 837 related to and/or associated with the URL (908). The browser application 718 can, for example, fetch the annotations 837 from local note storage 726, 831 or from notes 756 stored in a remote server computing system in association with the user account associated with the user 900. The browser application 718 can send, to the annotation renderer coordinator 835, current page annotation targets 836 (910), which can include portions of the rendered webpage.

The browser application 718 can display the annotation area 130 (e.g., a side-panel or overlay), with the annotations 837 fetched at (908). In an example in which the annotation 837 includes a modification of the text in the webpage (the annotation target 836 can include the webpage associated with the URL) such as lightly highlighting a portion of the text included in the webpage, the annotation renderer coordinator 835 can lightly highlight the annotation target (912)

Figure 10:
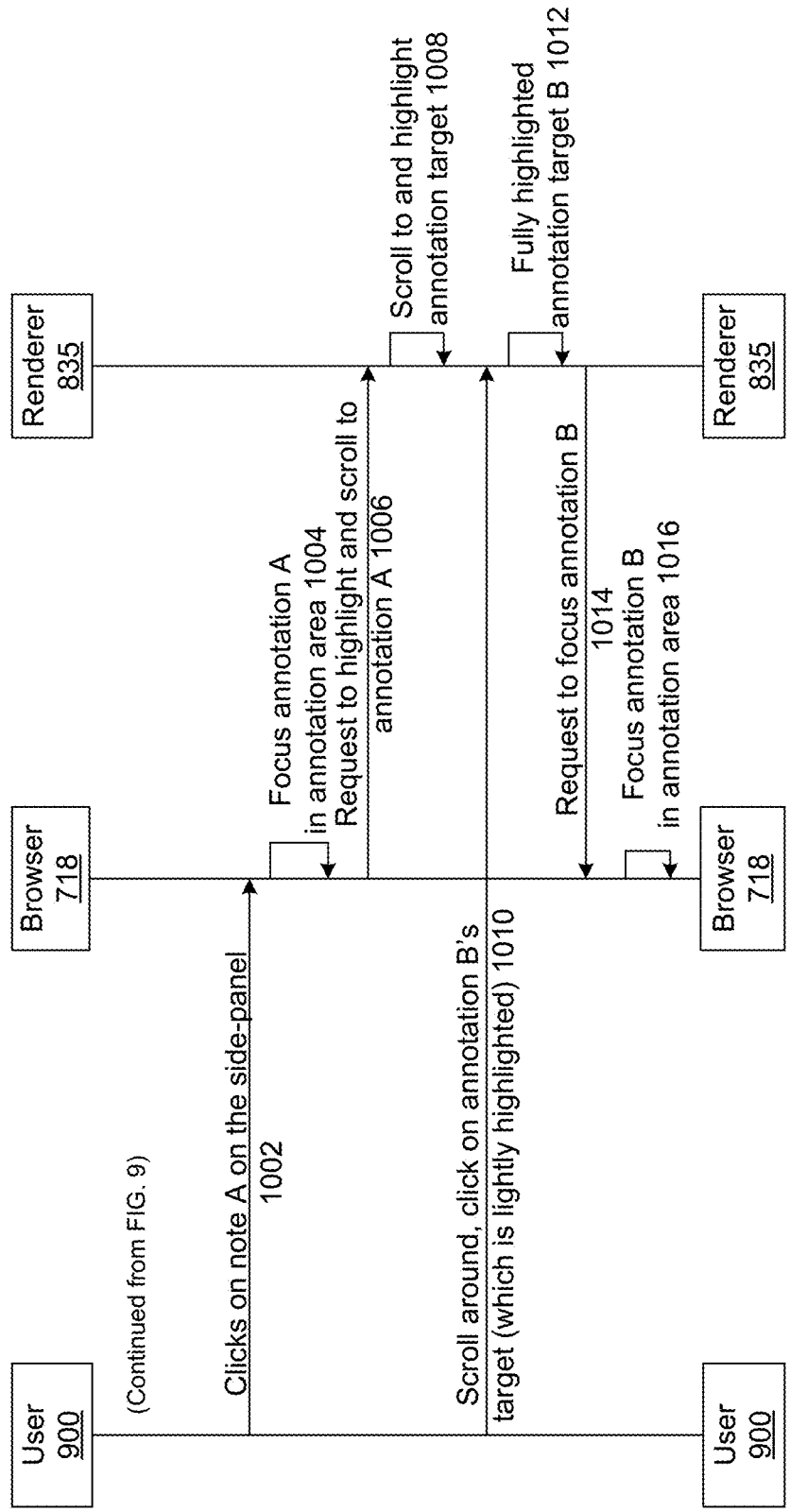
FIG. 10 is a timing diagram depicting example operations for navigating using annotations, according to an aspect.

FIG. 10 is a timing diagram depicting example operations for navigating using annotations, according to an aspect. In some examples, the actions shown and described with respect to FIG. 10 can be performed after the actions shown and described with respect to FIG. 9.

The user 900 can select, such as by clicking on, a first note, such as note A, on the annotation area 130 (1002) (e.g., a side-panel or overlay). The browser application 718 can respond to the selection of note A by focusing on annotation A in the annotation area 130 (1004), such as by making annotation A visible in the annotation area and/or side-panel.

The browser application 718 can also respond to the selection of note A by sending, to the annotation renderer coordinator 835, a request to highlight and scroll to annotation A (1006). The annotation renderer coordinator 835 can respond to the request (1006) by scrolling to and highlighting the annotation target (1008). The annotation target can include the portion of the webpage (such as a first portion of text) that was highlighted at (912), and the annotation can include modifying the first portion of text by highlighting the portion of text. The highlighting of the annotation target (1008) can be an example of performing an action on the webpage based on a stored annotation including a modification of the webpage.

The user 900 can scroll around and click on a target of a second annotation, which can be considered annotation B (1010). The annotation of the annotation target can be a first modification to a second portion of text included in the webpage associated with the URL. The first modification can include lightly highlighting the second portion of text. In an example, the annotation of annotation target B can include a second modification of the second portion of text, and the annotation renderer coordinator 835 can respond to the user clicking on the target of annotation B (1010) by performing the second modification of the target of annotation B (1012). The second modification can include fully highlighting the second portion of text, and/or a modification that is more visually apparent to the user, such as darker, less transparent, bolder, or having a more saturated color, as non-limiting examples. The annotation renderer coordinator 835 can send to the browser application 718, and/or the browser application 718 can receive from the annotation renderer coordinator 835, a request to focus on annotation B (1014). The browser application 718 can thereafter focus on annotation B in the annotation area 130 and/or side-panel (1016), such as by presenting annotation B in the side-panel and/or annotation area 130.

Figure 11:
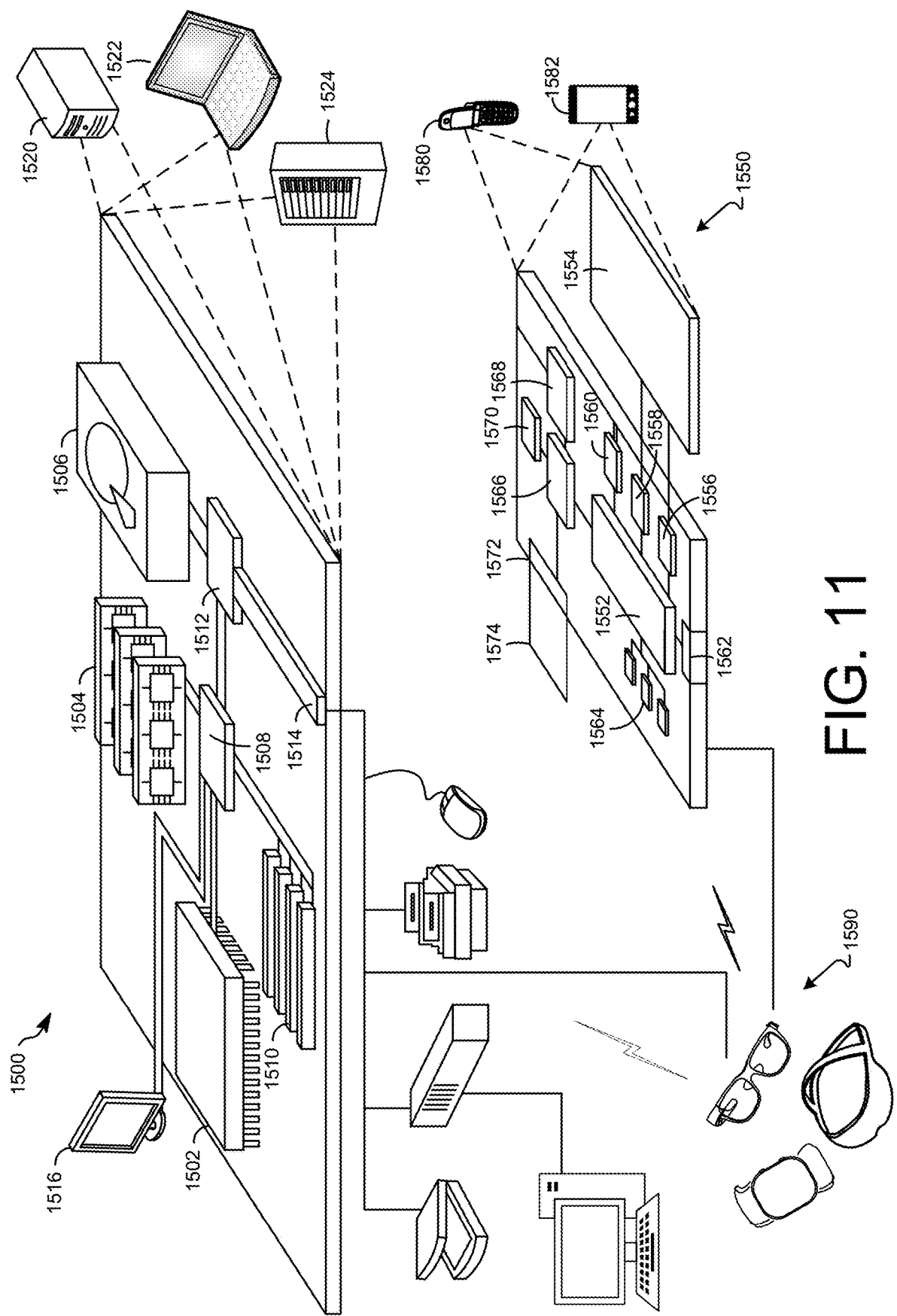
FIG. 11 shows an example of example computing devices according to an aspect.

FIG. 11 shows an example of example computing devices according to an aspect. In some implementations, the computer device 1500 is an example of the computing system 702. In some implementations, the computer device 1500 is an example of the server computing system 750. In some implementations, the mobile computer device 1550 is an example of the computing system 702. Computing device 1500 is intended to represent various forms of digital computers, such as laptops, desktops, tablets, workstations, personal digital assistants, televisions, servers, blade servers, mainframes, and other appropriate computing devices. Computing device 1550 is intended to represent various forms of mobile devices, such as personal digital assistants, cellular telephones, smart phones, and other similar computing devices. The components shown here, their connections and relationships, and their functions, are meant to be examples only, and are not meant to limit implementations of the implementations described and/or claimed in this document.

Computing device 1500 includes a processor 1502, memory 1504, a storage device 1506, a high-speed interface 1508 connecting to memory 1504 and high-speed expansion ports 1510, and a low speed interface 1512 connecting to low speed bus 1514 and storage device 1506. The processor 1502 can be a semiconductor-based processor. The memory 1504 can be a semiconductor-based memory. Each of the components 1502, 1504, 1506, 1508, 1510, and 1512, are interconnected using various busses, and may be mounted on a common motherboard or in other manners as appropriate. The processor 1502 can process instructions for execution within the computing device 1500, including instructions stored in the memory 1504 or on the storage device 1506 to display graphical information for a GUI on an external input/output device, such as display 1516 coupled to high speed interface 1508. In other implementations, multiple processors and/or multiple buses may be used, as appropriate, along with multiple memories and types of memory. Also, multiple computing devices 1500 may be connected, with each device providing portions of the necessary operations (e.g., as a server bank, a group of blade servers, or a multi-processor system).

The memory 1504 stores information within the computing device 1500. In one implementation, the memory 1504 is a volatile memory unit or units. In another implementation, the memory 1504 is a non-volatile memory unit or units. The memory 1504 may also be another form of computer-readable medium, such as a magnetic or optical disk.

The storage device 1506 is capable of providing mass storage for the computing device 1500. In one implementation, the storage device 1506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1504, the storage device 1506, or memory on processor 1502.

The high speed controller 1508 manages bandwidth-intensive operations for the computing device 1500, while the low speed controller 1512 manages lower bandwidth-intensive operations. Such allocation of functions is an example only. In one implementation, the high-speed controller 1508 is coupled to memory 1504, display 1516 (e.g., through a graphics processor or accelerator), and to high-speed expansion ports 1510, which may accept various expansion cards (not shown). In the implementation, low-speed controller 1512 is coupled to storage device 1506 and low-speed expansion port 1514. The low-speed expansion port, which may include various communication ports (e.g., USB, BLUETOOTH, Ethernet, wireless Ethernet) may be coupled to one or more input/output devices, such as a keyboard, a pointing device, a scanner, or a networking device such as a switch or router, e.g., through a network adapter.

The computing device 1500 may be implemented in a number of different forms, as shown in the figure. For example, it may be implemented as a standard server 1520, or multiple times in a group of such servers. It may also be implemented as part of a rack server system 1524. In addition, it may be implemented in a personal computer such as a laptop computer 1522. Alternatively, components from computing device 1500 may be combined with other components in a mobile device (not shown), such as device 1550. Each of such devices may contain one or more of computing devices 1500, 1550, and an entire system may be made up of multiple computing devices 1500, 1550 communicating with each other.

Computing device 1550 includes a processor 1552, memory 1564, an input/output device such as a display 1554, a communication interface 1566, and a transceiver 1568, among other components. The device 1550 may also be provided with a storage device, such as a microdrive or other device, to provide additional storage. Each of the components 1550, 1552, 1564, 1554, 1566, and 1568, are interconnected using various buses, and several of the components may be mounted on a common motherboard or in other manners as appropriate.

The processor 1552 can execute instructions within the computing device 1550, including instructions stored in the memory 1564. The processor may be implemented as a chipset of chips that include separate and multiple analog and digital processors. The processor may provide, for example, for coordination of the other components of the device 1550, such as control of user interfaces, applications run by device 1550, and wireless communication by device 1550.

Processor 1552 may communicate with a user through control interface 1558 and display interface 1556 coupled to a display 1554. The display 1554 may be, for example, a TFT LCD (Thin-Film-Transistor Liquid Crystal Display) or an OLED (Organic Light Emitting Diode) display, or other appropriate display technology. The display interface 1556 may comprise appropriate circuitry for driving the display 1554 to present graphical and other information to a user. The control interface 1558 may receive commands from a user and convert them for submission to the processor 1552. In addition, an external interface 1562 may be provided in communication with processor 1552, so as to enable near area communication of device 1550 with other devices. External interface 1562 may provide, for example, for wired communication in some implementations, or for wireless communication in other implementations, and multiple interfaces may also be used.

The memory 1564 stores information within the computing device 1550. The memory 1564 can be implemented as one or more of a computer-readable medium or media, a volatile memory unit or units, or a non-volatile memory unit or units. Expansion memory 1574 may also be provided and connected to device 1550 through expansion interface 1572, which may include, for example, a SIMM (Single In Line Memory Module) card interface. Such expansion memory 1574 may provide extra storage space for device 1550, or may also store applications or other information for device 1550. Specifically, expansion memory 1574 may include instructions to carry out or supplement the processes described above, and may include secure information also. Thus, for example, expansion memory 1574 may be provided as a security module for device 1550, and may be programmed with instructions that permit secure use of device 1550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1564, expansion memory 1574, or memory on processor 1552 that may be received, for example, over transceiver 1568 or external interface 1562.

Device 1550 may communicate wirelessly through communication interface 1566, which may include digital signal processing circuitry where necessary. Communication interface 1566 may provide for communications under various modes or protocols, such as GSM voice calls, SMS, EMS, or MMS messaging, CDMA, TDMA, PDC, WCDMA, $CDMA_{2000}$, or GPRS, among others. Such communication may occur, for example, through radio-frequency transceiver 1568. In addition, short-range communication may occur, such as using a BLUETOOTH, Wi-Fi, or other such transceiver (not shown). In addition, GPS (Global Positioning System) receiver module 1570 may provide additional navigation- and location-related wireless data to device 1550, which may be used as appropriate by applications running on device 1550.

Device 1550 may also communicate audibly using audio codec 1560, which may receive spoken information from a user and convert it to usable digital information. Audio codec 1560 may likewise generate audible sound for a user, such as through a speaker, e.g., in a handset of device 1550. Such sound may include sound from voice telephone calls, may include recorded sound (e.g., voice messages, music files, etc.) and may also include sound generated by applications operating on device 1550.

The computing device 1550 may be implemented in a number of different forms, as shown in the figure. For example, it may be implemented as a cellular telephone 1580. It may also be implemented as part of a smart phone 1582, personal digital assistant, tablet, wearable 1590, or another similar mobile device.

In some implementations, the computing devices depicted in the figure can include sensors that interface with a wearable (e.g., AR headset/HMD) device 1590 to generate an augmented environment for viewing inserted content within the physical space. For example, one or more sensors included on a computing device 1550 or other computing device depicted in the figure, can provide input to the AR headset 1590 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 1550 can use the sensors to determine an absolute position and/or a detected rotation of the computing device in the AR space that can then be used as input to the AR space. For example, the computing device 1550 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connected to, the computing device 1550 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1550 when the computing device is incorporated into the AR space can cause a particular action to occur in the AR space.

In some implementations, a touchscreen of the computing device 1550 can be rendered as a touchpad in AR space. A user can interact with the touchscreen of the computing device 1550. The interactions are rendered, in AR headset 1590 for example, as movements on the rendered touchpad in the AR space. The rendered movements can control virtual objects in the AR space.

In some implementations, one or more output devices included on the computing device 1550 can provide output and/or feedback to a user of the AR headset 1590 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the implementations disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Although certain example computer-implemented methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

In one aspect, a non-transitory computer-readable medium stores instructions that, when executed by a processor on a receiving computing device, causes the receiving computing device to perform any of the methods disclosed herein.

In one aspect, a computing device can be configured with at least one processor and memory storing instructions that, when executed by the at least one processor, performs any of the methods disclosed herein.

The invention claimed is:

1. A method performed by a browser, the method comprising:
   presenting a webpage in a browser content window, the webpage being associated with a first resource address;
   presenting an annotation area, the annotation area being outside the browser content window;
   receiving, in association with a user account, an annotation for a tab group in the annotation area, the tab group including the first resource address and a second resource address; and
   storing the annotation in association with the user account and the tab group.

2. The method of claim 1, wherein:
   storing the annotation includes storing the annotation in association with the user account and the tab group locally in a long-term storage,
   wherein the webpage is not stored locally in the long-term storage.

3. The method of claim 1, wherein the annotation causes a modification of an appearance of a portion of text included in the webpage.

4. The method of claim 3, wherein the modification occurs using a rendering process that is distinct from a rendering process that rendered the webpage.

5. The method of claim 1, wherein storing the annotation occurs without notifying a server associated with the first resource address.

6. The method of claim 1, wherein the annotation is stored on a local computing device on which the browser is executing.

7. The method of claim 1, wherein the annotation is stored in an annotation record with a metadata portion, a body portion, and a target portion.

8. The method of claim 1, wherein:
   the webpage includes a first webpage in a first tab of the tab group;
   the annotation includes a first annotation;
   the tab group includes the first tab and a second tab, the second tab being associated with the second resource address; and
   the method further includes:
      detecting a pre-selection action on a third resource address in a third tab; and
      in response to detecting the pre-selection action, presenting a preview area for the third resource address, the preview area including a second annotation for the third resource address.

9. The method of claim 1, further comprising:
   receiving a request to view the webpage associated with the first resource address;
   in response to receiving the request to view the webpage, retrieving the annotation;

in response to retrieving the annotation, adding a notification in an address bar area indicating that the tab group has at least one annotation; and
receiving a selection of the notification,
wherein presenting the annotation area occurs responsive to receiving the selection of the notification.

10. The method of claim 1, further comprising:
receiving a selection of the annotation; and
in response to receiving the selection of the annotation, scrolling to a portion of the webpage associated with the annotation, the annotation being associated with text within the webpage.

11. The method of claim 1, wherein receiving the annotation includes receiving a selection of an image included in the webpage.

12. The method of claim 1, further comprising:
analyzing content of the webpage to identify suggested annotation content;
presenting the suggested annotation content as a selectable element, and
receiving a selection of the suggested annotation content, wherein receiving the annotation occurs responsive to the selection of the suggested annotation content.

13. A non-transitory computer-readable storage medium comprising instructions stored thereon that, when executed by at least one processor, are configured to cause a computing system to:
present a webpage in a browser content window, the webpage being associated with a first resource address;
present an annotation area, the annotation area being outside the browser content window;
receive, in association with a user account, an annotation for a tab group in the annotation area, the tab group including the first resource address and a second resource address; and
store the annotation in association with the user account and the tab group.

14. The non-transitory computer-readable storage medium of claim 13, wherein:
storing the annotation includes storing the annotation in association with the user account and the tab group locally in a long-term storage,
wherein the webpage is not stored locally in the long-term storage.

15. The non-transitory computer-readable storage medium of claim 13, wherein the annotation causes a modification of an appearance of a portion of text included in the webpage.

16. The non-transitory computer-readable storage medium of claim 15, wherein the modification occurs using a rendering process that is distinct from the rendering process that rendered the webpage.

17. The non-transitory computer-readable storage medium of claim 13, wherein the instructions are further configured to cause the computing system to:
receive a request to view the webpage associated with the first resource address;
in response to receiving the request to view the webpage, retrieve the annotation;
in response to retrieving the annotation, add a notification in an address bar area indicating that the tab group has at least one annotation; and
receive a selection of the notification,
wherein presenting the annotation area occurs responsive to receiving the selection of the notification.

18. A computing system comprising:
at least one processor; and
a non-transitory computer-readable storage medium comprising instructions stored thereon that, when executed by the at least one processor, are configured to cause the computing system to:
present a webpage in a browser content window, the webpage being associated with a first resource address;
present an annotation area, the annotation area being outside the browser content window;
receive, in association with a user account, a first an annotation for a tab group in the annotation area, the tab group including the first resource address and a second resource address; and
store the annotation in association with the user account and the tab group.

19. The computing system of claim 18, wherein:
storing the annotation includes storing the first annotation in association with the user account and the first resource address locally in a long-term storage,
wherein the webpage is not stored locally in the long-term storage.

20. The computing system of claim 18, wherein the first annotation causes a modification of an appearance of a portion of text included in the webpage.

* * * * *

UNITED STATES PATENT AND TRADEMARK OFFICE
CERTIFICATE OF CORRECTION

| | |
|---|---|
| PATENT NO. | : 12,026,454 B2 |
| APPLICATION NO. | : 18/148789 |
| DATED | : July 2, 2024 |
| INVENTOR(S) | : Chang et al. |

It is certified that error appears in the above-identified patent and that said Letters Patent is hereby corrected as shown below:

In the Claims

In Column 24, Claim 18, Line 30, after "account," delete "a first".

In Column 24, Claim 19, Line 38, after "the" delete "first".

In Column 24, Claim 20, Line 43, after "the" delete "first".

Signed and Sealed this
Fifth Day of November, 2024

Katherine Kelly Vidal
*Director of the United States Patent and Trademark Office*